US012687060B2

(12) United States Patent
Mesaros

(10) Patent No.: US 12,687,060 B2
(45) Date of Patent: Jul. 21, 2026

(54) SYSTEM FOR THE CONTROLLED ROTARY MOVEMENT OF A DOOR, A LEAF OR THE LIKE

(71) Applicant: Colcom Group S.p.A., Nave (IT)

(72) Inventor: Mihai Mesaros, Nave (IT)

( * ) Notice: Subject to any disclaimer, the term of this patent is extended or adjusted under 35 U.S.C. 154(b) by 206 days.

(21) Appl. No.: 18/557,932

(22) PCT Filed: May 5, 2022

(86) PCT No.: PCT/IB2022/054145
§ 371 (c)(1),
(2) Date: Oct. 28, 2023

(87) PCT Pub. No.: WO2022/234499
PCT Pub. Date: Nov. 10, 2022

(65) Prior Publication Data

US 2024/0229533 A1 Jul. 11, 2024

(30) Foreign Application Priority Data

May 6, 2021 (IT) ........................ 102021000011666
May 6, 2021 (IT) ........................ 102021000011669
May 6, 2021 (IT) ........................ 102021000011678

(51) Int. Cl.
*E05F 3/10* (2006.01)
*E05F 1/12* (2006.01)
(Continued)

(52) U.S. Cl.
CPC ............ *E05F 3/104* (2013.01); *E05F 1/1253* (2013.01); *E05F 1/1269* (2013.01); *E05F 3/12* (2013.01);
(Continued)

(58) Field of Classification Search
CPC ....... E05F 1/1253; E05F 1/1269; E05F 3/104; E05F 3/12; E05F 3/20; E05F 3/225;
(Continued)

(56) References Cited

U.S. PATENT DOCUMENTS 987,467 A * 3/1911 Katzenberger ............ E05D 3/00 16/281
3,246,362 A * 4/1966 Jackson .................... E05F 3/12 16/51
(Continued)

FOREIGN PATENT DOCUMENTS

DE 102015109315 A1 * 12/2016 ........... E05D 5/0246
DE 102017104304 5/2018
(Continued)

*Primary Examiner* — Jason W San
*Assistant Examiner* — Matthew J Sullivan
(74) *Attorney, Agent, or Firm* — Themis Law

(57) ABSTRACT

A system for the rotary coupling of a closing element about a stationary support structure includes a first hinge device and at least one second hinge device. The first and the second hinge devices include a movable element having a hinge body and a fixed element having a pivot. The hinge body and the pivot are rotatably coupled to each other to rotate between the open and closed position of the closing element. The first and second hinge devices can be coupled to the same coupling element so that they cooperate to control the rotation of the closing element between the open and the closed position.

15 Claims, 22 Drawing Sheets

(51) Int. Cl.
*E05F 3/12* (2006.01)
*E05F 3/20* (2006.01)

(52) U.S. Cl.
CPC .......... *E05F 3/20* (2013.01); *E05Y 2201/256* (2013.01); *E05Y 2201/264* (2013.01)

(58) Field of Classification Search
CPC ..... E05F 3/227; E05F 5/02; E05F 5/06; E05F 15/73; E05F 11/105; E05Y 2900/132; E05Y 2201/638; E05Y 2201/256; E05Y 2201/264; E05D 11/1064
See application file for complete search history.

(56) References Cited

U.S. PATENT DOCUMENTS 3,474,485 A * 10/1969 Mittig .................... E05F 3/104 16/55
4,785,493 A * 11/1988 Tillmann ................ E05F 3/104 16/56
5,829,097 A * 11/1998 Toledo .................... E05F 3/104 16/56
6,442,795 B1 * 9/2002 Chen ...................... E05F 3/104 16/60
8,806,715 B2 * 8/2014 Bienek ................ F16K 31/0627 16/49
8,863,356 B2 * 10/2014 Bacchetti .................. E05F 3/10 16/54
10,337,229 B2 * 7/2019 Beattie ...................... E05F 3/20
10,400,495 B1 * 9/2019 Yu .......................... E05F 3/102
10,822,853 B2 * 11/2020 Yu .......................... E05F 3/223
10,914,109 B2 * 2/2021 Shinmura ............... E05D 7/081
10,961,761 B2 * 3/2021 Vos ......................... E05F 3/104
11,261,637 B2 * 3/2022 Bacchetti .............. E05F 1/1253
11,396,768 B2 * 7/2022 Juntunen .................... E05F 3/12
12,000,190 B2 * 6/2024 Dries .................... E05D 11/105
12,037,829 B2 * 7/2024 Benedetti .............. E05F 1/1253
12,091,904 B2 * 9/2024 Benedetti ................ E05F 3/106
2004/0088822 A1 * 5/2004 Huang .................... E05F 3/104 16/60
2013/0081227 A1 * 4/2013 Hensh ..................... E05F 3/104 16/53
2017/0241180 A1 * 8/2017 Bacchetti .................. E05F 3/20
2017/0268275 A1 * 9/2017 Bacchetti .................. E05F 3/20
2021/0164279 A1 * 6/2021 Lygin ...................... E05F 3/227
2024/0200383 A1 * 6/2024 Bacchetti ................ E05F 3/102
2025/0188783 A1 * 6/2025 Bacchetti .............. E05F 1/1246
2025/0263961 A1 * 8/2025 Patje ...................... E05D 15/54

FOREIGN PATENT DOCUMENTS

DE 102017104304 B3 * 5/2018 ........... E05D 5/0246
JP H084406 A * 1/1996
KR 102095384 3/2020
KR 102095384 B1 * 3/2020 ......... E05D 11/0054

* cited by examiner

SYSTEM FOR THE CONTROLLED ROTARY MOVEMENT OF A DOOR, A LEAF OR THE LIKE

FIELD OF THE INVENTION

The present invention generally relates to the technical field of hinges, and in particular it relates to a system for the controlled rotary movement of a closing element, such as a door, a door leaf or the like, with respect to a stationary support structure, such as for example a frame, a false frame or a floor.

STATE OF THE ART

Hinges for the rotary movement of a closing element, such as a door or door leaf, in particular made of glass, with respect to a supporting structure, are known.

Such hinges typically comprise a fixed element anchored to the support structure and a movable element articulated to the door, susceptible to mutually rotate with respect to each other.

The need to dampen the opening and/or closing of such glass door leaves, in order to avoid breakage thereof caused by impacts or forcing by an incautious user is known.

In this regard, hinges which allow simultaneously to carry out a plurality of functions including damping, braking, final snapping or other functions depending on the needs are known.

This requirement is generally met by using adjustment systems which are difficult to manufacture, typically acting on the internal mechanical part of the hinge. Such hinges are particularly complex and difficult to assemble. Furthermore, such hinges allow to move the door only in some predetermined ways, that is according to a so-called single predetermined "law of motion".

SUMMARY OF THE INVENTION

An object of the present invention is to at least partially overcome the drawbacks outlined above, by providing a system for the controlled rotary movement of a closing element that is highly functional and cost-effective.

Another object of the present invention is to provide a system that allows to control the movement of the closing element in a particularly effective manner.

Another object is to provide a system that allows to compensate for any gaps between the closing element and the stationary support structure during assembly.

These and other objects that will be more apparent hereinafter, are attained as described and/or claimed and/or illustrated herein.

Advantageous embodiments of the invention are defined according to the dependent claims.

BRIEF DESCRIPTION OF THE DRAWINGS

Further characteristics and advantages of the invention will be more apparent in light of the detailed description some preferred but non-exclusive embodiments of the invention, illustrated by way of non-limiting example with reference to the attached drawings, wherein.

DETAILED DESCRIPTION OF SOME PREFERRED EMBODIMENTS

With reference to the mentioned figures, herein described is a system 1 for the rotary movement of a closing element A, such as a door leaf, a door, or the like, with respect to a stationary support structure S, such as a wall, a floor, a frame or the like.

The present invention may include various parts and/or similar or identical elements. Unless otherwise specified, similar or identical parts and/or elements will be indicated using a single reference number, it being clear that the described technical characteristics are common to all similar or identical parts and/or elements.

Essentially, the system 1 may comprise two or more hinge devices 100, 200 which may cooperate to move the door A around a rotation axis X.

To this end, each hinge device 100, 200 may be connected to the stationary support structure by means of respective fixing means, for example fixing plates 190, 290, and it may rotate around a respective axis X1, X2. Once installed, the axes X1, X2 of the hinge devices 100, 200 may coincide to define the rotation axis X of the closing element between one or more open and closed positions.

Figure 1:
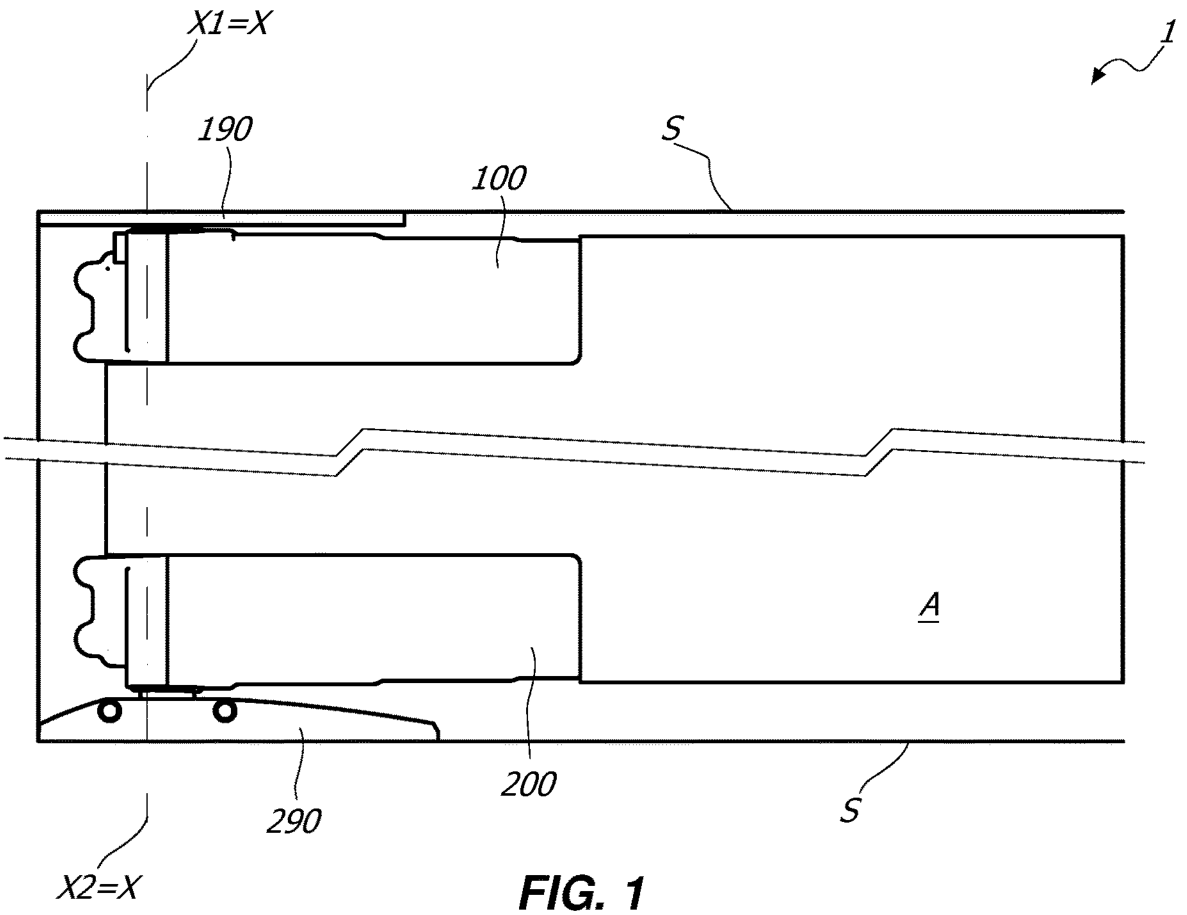
FIG. 1 is a front schematic view of a system 1.
Figure 2:
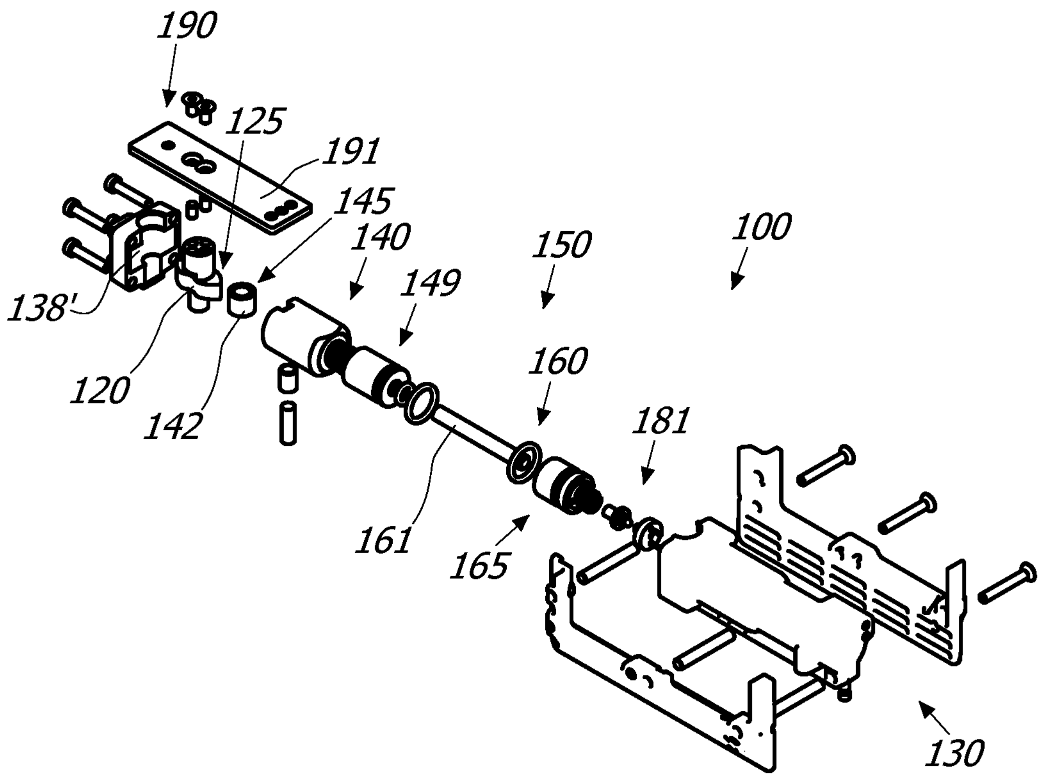
FIGS. 2 and 3 are an exploded view of the hinges 100 and 200.
Figure 3:
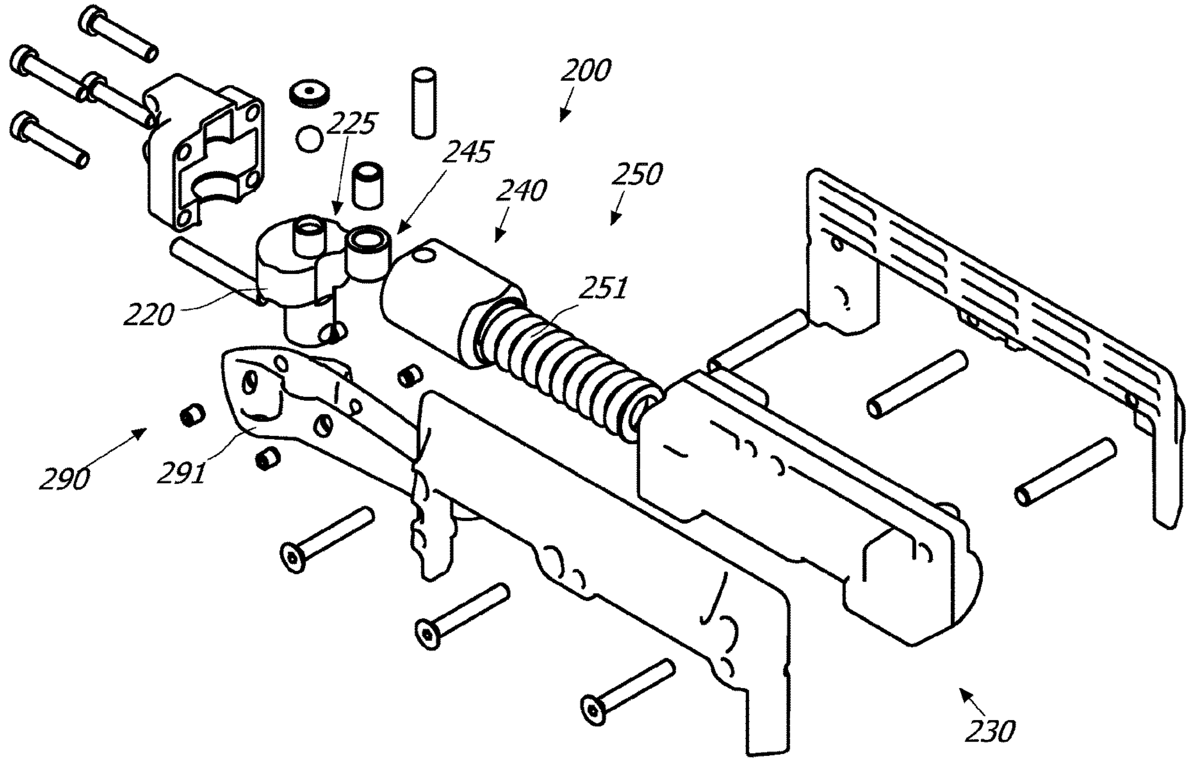

FIG. 1 shows fixing plates 190, 290 fixed to the frame S and hinge devices 100, 200 with the door A. Although hereinafter reference will be made to such embodiment for the sake of simplicity, it is clear that the latter is not exclusive. As a matter of fact, one or both of the hinge devices 100, 200 may be coupled to the frame S while one or both of the fixing plates 190, 290 may be coupled to the door A. Furthermore, the hinge devices 100, 200 and the fixing plates 190, 290 may be fixed to any closing element and to any stationary support structure.

It is clear that the door A may also be moved by a single hinge device, for example the device 100. For example, a movement system comprising the hinge device 100 mounted at the lower part and an idle hinge mounted at the upper part may be provided for.

It is also clear that the hinge devices 100, 200 may include any means for fixing to the door A or to the frame S, without departing from the scope of protection of the attached claims.

Possibly, each of the hinge devices 100, 200 may be a closing and/or control hinge. For the sake of simplicity, the hinge device positioned at the upper part was indicated with reference numeral 100 while the one positioned at the lower part was indicated with reference numeral 200 in the attached drawings.

Advantageously, the hinge devices 100 and 200 can be synchronised. In particular, both the hinge devices 100 and 200 may cooperate to control the movement of the door A for one or more sections of the movement of the latter between the open and closed position. Preferably, the hinge devices 100 and 200 may cooperate to control the movement of the door A along the entire movement from the open to the closed position and/or vice versa or for part thereof.

Each of the hinge devices 100, 200 may therefore dampen or promote the rotation of the door A between the open and closed position. Preferably, as better explained hereinafter, each of the hinge devices 100 200 may exert a different action along different sections of the rotation of the door A.

The control of the movement of the door A may therefore be the result of the action of both the hinge devices 100 and 200.

In other words, the so-called "law of motion" of door A, that is the equation that describes the motion of the latter as a function of the position in space and of time, may be the combination of the "law of motion" of the individual hinged devices 100, 200.

It is clear that the hinge devices 100, 200 may be of any type, without departing from the scope of protection of the present invention.

Preferably, the hinge devices 100, 200 may comprise a pivot 120, 220, which may be fixed to one of the door A and the frame S, and a hinge body 130, 230 which may be fixed to the other of the door A and the frame S.

The hinge body 130, 230 and the pivot 120, 200 may therefore be rotatably coupled to each other to mutually rotate respectively around the axes X1, X2 respectively between a respective operative position corresponding to the open or closed position of the closing element A and an operative position corresponding to the closed or open position of the closing element A.

Figure 5:
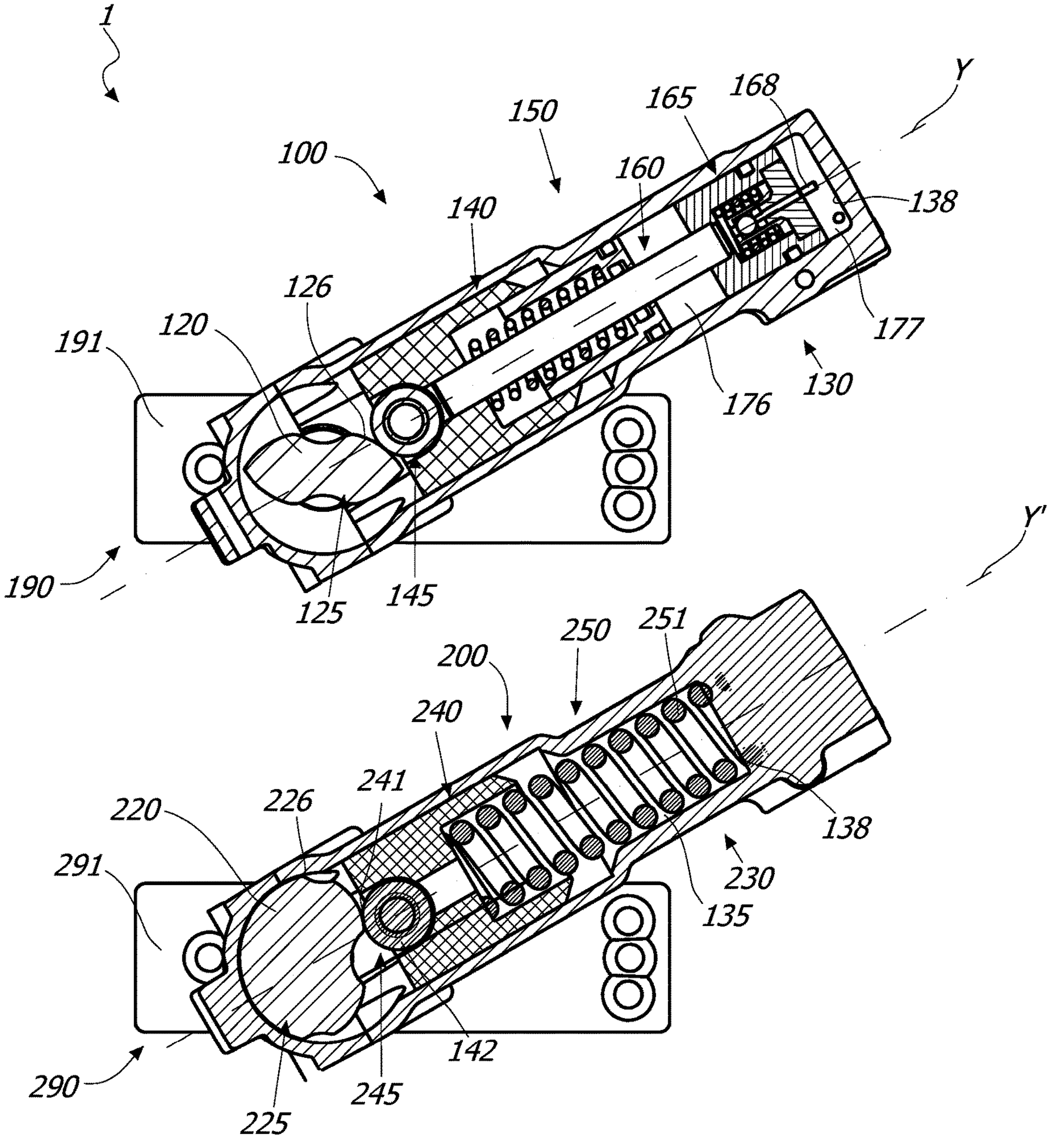
Figure 6:
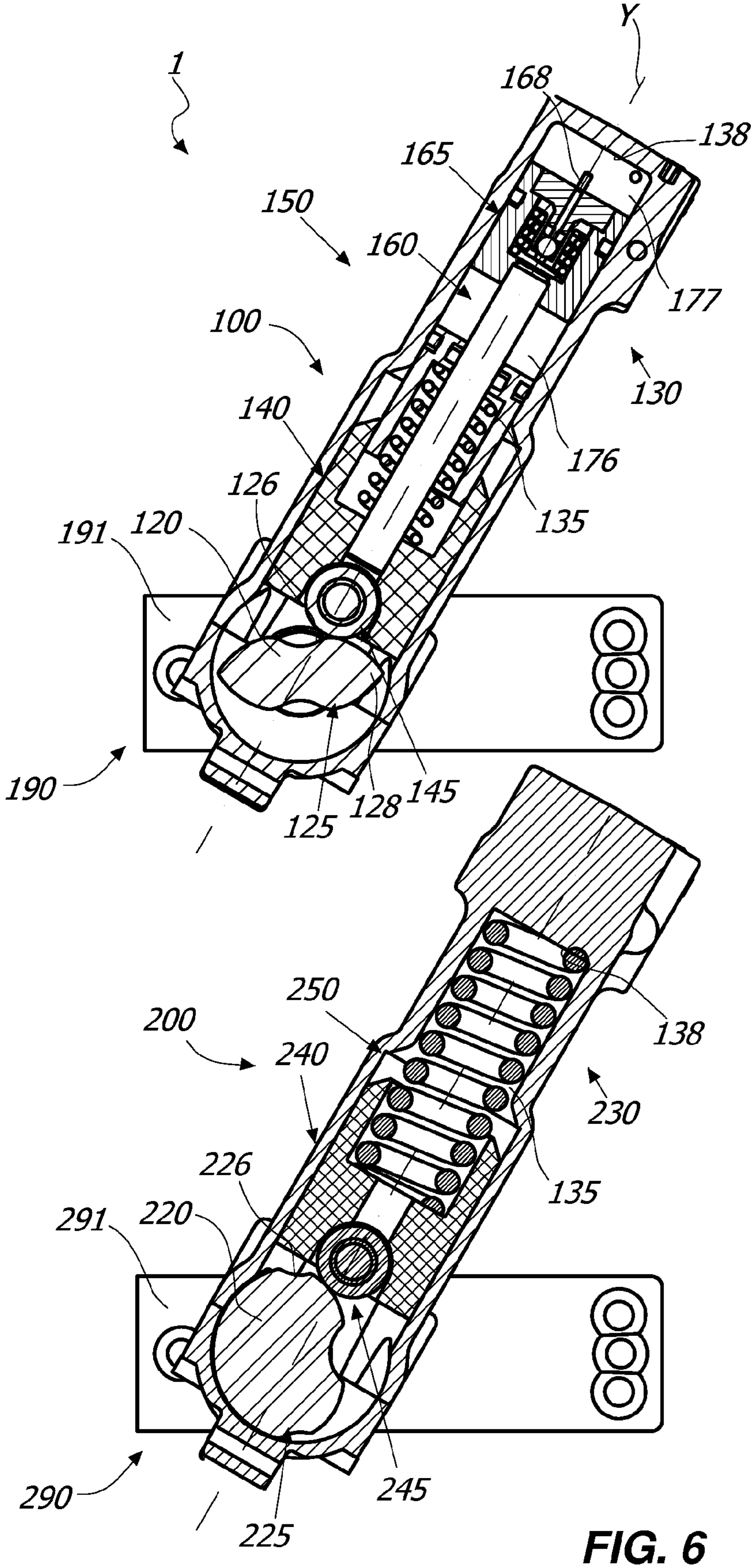
Figure 7:
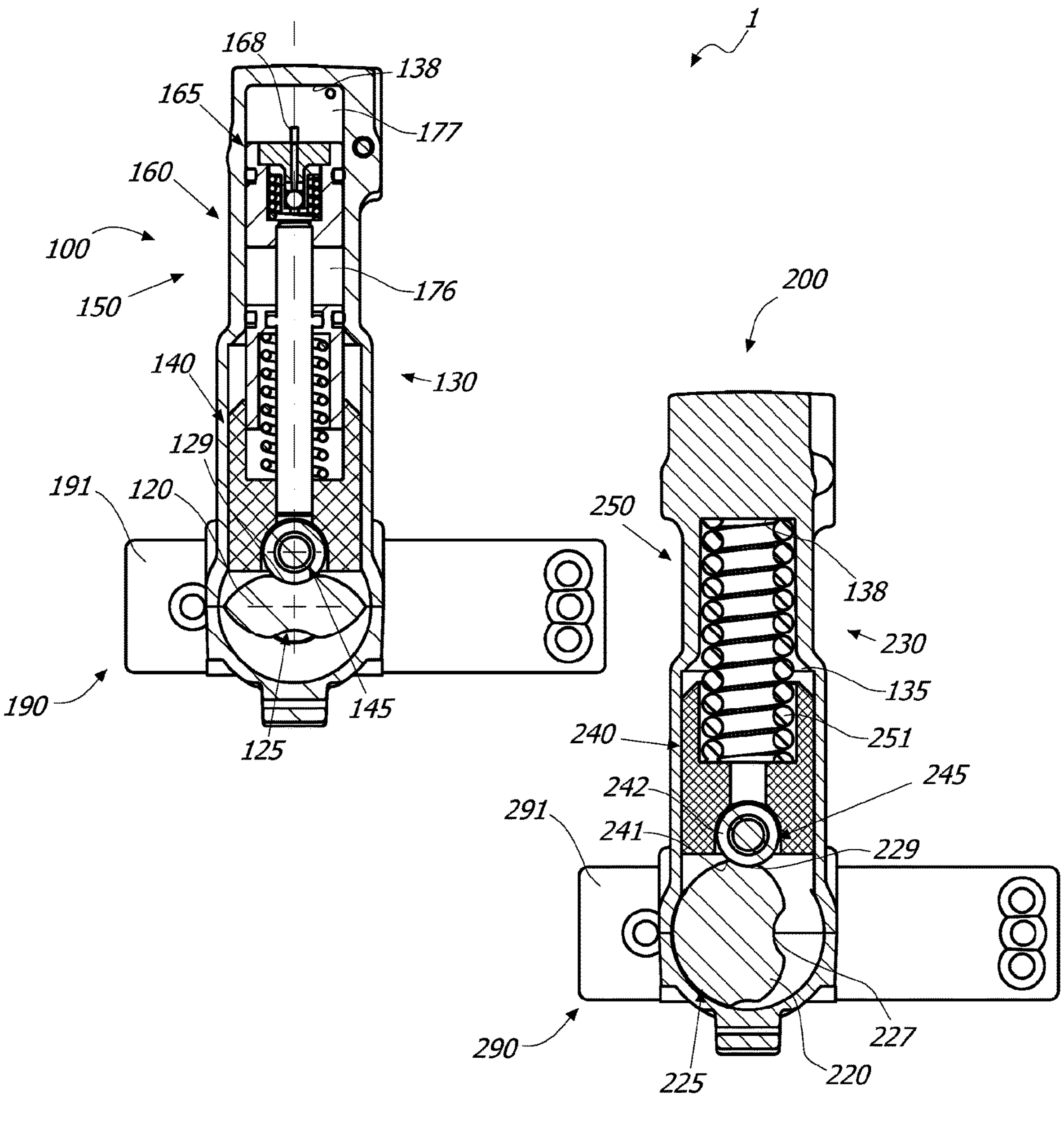
Figure 8:
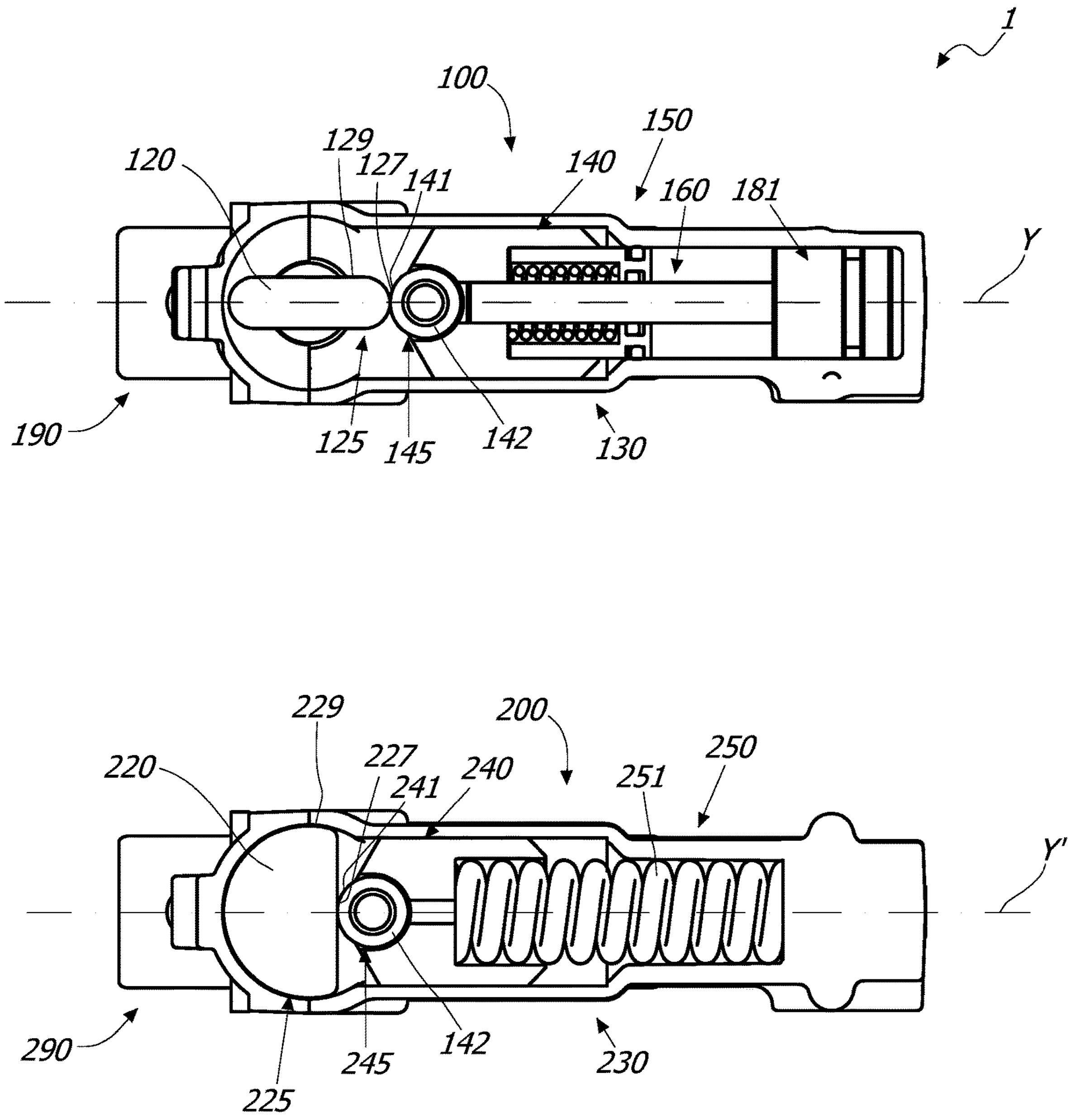
FIGS. 8 and 9 are a cross-sectional view of a different shape of the system 1 in which the hinges 100, 200 have an angle of 0° and 90° respectively with the respective fixing plates 190 290.
Figure 9:
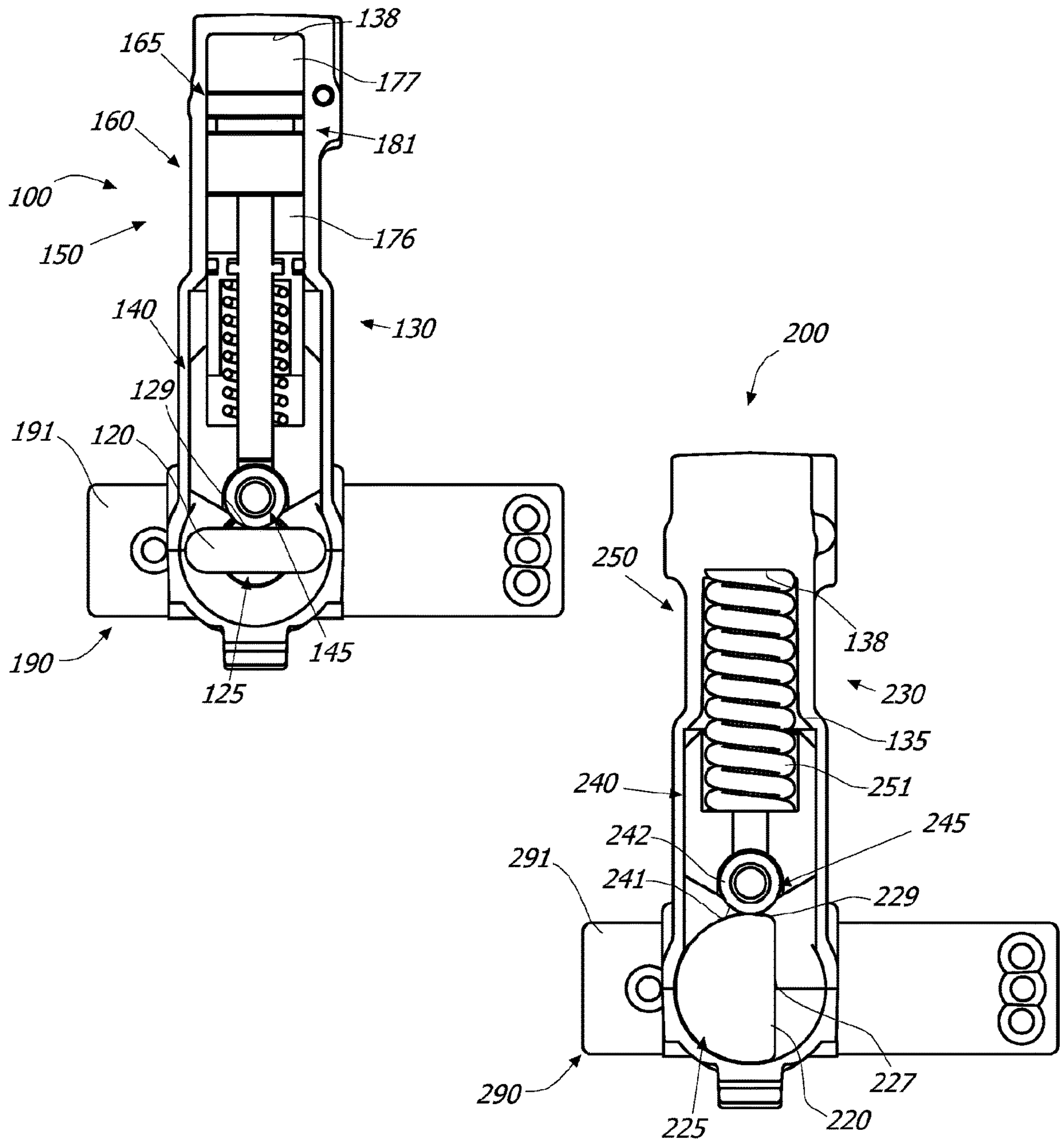
Figure 10:
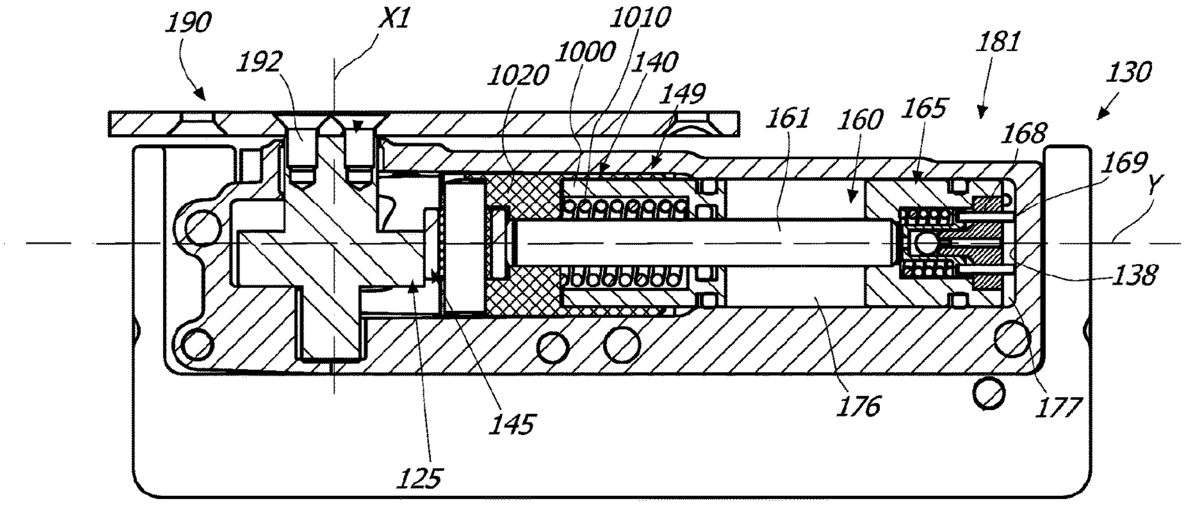
FIGS. 10, 12 and 14 are a cross-sectional view the hinge 100 with a different embodiment of the valve means 181 in different operative positions, with FIGS. 11, 13 and 15 showing an enlargement of some details respectively of FIGS. 10, 12 and 14.

Advantageously, in the non-limiting examples of the system 1 shown in FIGS. 4-9, both hinge devices 100, 200 may have the fixed pivot 120, 220 and the hinge body 130, 233 rotating between the door closed position (FIG. 4 and FIG. 8) and the door open position (FIG. 7 and FIG. 9).

Preferably, the pivot 120, 220 may be fixed to the frame S by means of the fixing plate 190, 290, while the hinge body 130, 230 may be fixed to the door A in a per se known manner to rotate integrally joined therewith.

Each of the hinge devices 100, 200 may comprise means 150, 250 for controlling the mutual rotation of the pivot 120, 220 and of the hinge body 130, 230.

In general, the means 150, 250, which may be of the mechanical and/or hydraulic type, may be configured so as to dampen or promote the rotation of the hinge body 130, 230 with respect to the pivot 120, 220 for at least one section of the rotation of the door A between the open and closed position.

Advantageously, the means 150, 250 may operate simultaneously when closing the door A.

Although not shown, it is however clear that the system 1 may have different configurations. For example, the means 150, 250 may operate along different sections of the closure, for example the means 150 at the beginning and the means 250 at the end. Possibly, one of the means 150 and 250 may operate when opening while the other of the means 150 and 250 may operate when closing the door A.

On the other hand, the hinge 100 and the hinge 200 may be configured so that the means 150 and/or 250 operate only upon the rotation of the door A for a section from one of the open position and the closed position toward the other of the open position and the closed position and not operate upon the rotation of the door A for the same section from the other of the open position and the closed position toward the one of the open position and the closed position but the only means 250 operate.

According to a preferred embodiment of the invention, the means 250 of the hinge 200 may be configured to promote the closing of the door A while the means 150 of the hinge 100 may be configured to dampen the closing of the door A.

In other words, when closing the door A, the hinge device 100 opposes the action of the hinge device 200.

It is clear that this configuration may be obtained by means of different types of hinge devices 100, 200 which may comprise different types of means 150, 250.

Preferably, the hinge devices 100 and 200 may comprise the hinge body 130, 230 which internally comprises a working chamber 135 defining a respective axis Y, Y' substantially perpendicular to the respective axis X1 and X2.

Furthermore, the hinge devices 100 and 200 may comprise a slider element 140, 240 slidable in the respective working chamber 135. In particular, the chamber 135 may comprise a pair of opposite bottom walls 138, 138'. The slider 140, 240 may then slide along the respective axis Y, Y' between a position proximal to the bottom wall 138 and a position distal therefrom.

Suitably, the pivot 120, 220 may be operatively connected with or include respective cam means 125, 225, while the slider element 140, 240 may be operatively connected with or include cam follower means 145, 245.

The cam 125, 225 and cam follower 145, 245 means may be operatively connected to each other so that the rotation of the hinge body 130, 230 corresponds to the sliding of the respective slider 140, 240 between the distal and proximal positions.

Advantageously, the means 150 and 250 can control the sliding of the slider 140 and 240 and therefore control the rotation of the door A.

Preferably, the control means 150 may be hydraulic and they may be configured to dampen the sliding of the slider 140 at least upon the movement of the door from the open position to the closed position. On the other hand, the control means 250 may be of the mechanical type and they may be configured to promote the sliding of the slider 140 at least upon the movement of the door from the open position to the closed position.

For example, the means 250 may comprise a spring 251 interposed between the slider element 240 and the bottom wall 138 so as to promote the sliding of the slider 240 from the proximal position to the distal position.

It is clear that according to the configuration of the cam 125 and cam follower 145 means and of the means 150 for controlling the sliding of the slider 140, same case applying to the configuration of the cam 225 and cam follower 245 means and of the means 250 for controlling the sliding of the slider 240, the respective hinge device 100, 200 may control the rotation of the door A in a different manner.

Advantageously, as better explained hereinafter, the hinge device 200 may promote the closing of the door A, while the hinge device 100 may counteract the action of the hinge 200 so that the closing speed of the door A along a predetermined section is predetermined. This speed may vary or it may be substantially constant.

This section may vary depending on the configurations of the hinge devices 100, 200, as better explained hereinafter. For example, such an angular section may be the segment comprised between 0° and 90°, or between 10° and 90° (for example in case of a final snap), or between 0° and 80° (in case of a door open stop position), or between 10° and 80° (in case of stop and snap).

In other words, as described above, the laws of motion of the hinge devices 100 and 200 may be combined to define the law of motion of the door A. The latter may vary depending on the configuration of the hinge devices 100, 200, preferably it may allow the closing of the door A at a constant speed.

Below is the description of some preferred but not exclusive examples of the hinge devices 100 and 200 having the advantages described above.

The cam means 125 and the cam means 225 may be shaped differently with respect to each other. In this manner, the rotation of the door A for at least one section during the closing may correspond to a different sliding of the respective slider 140 and 240.

Suitably, the cam means 125, 245 may be configured to promote the sliding of the slider element 140, 240 in an opposite manner. For example, when closing the door A, the slider 140 may slide in one direction while the slider 240 may slide in the opposite direction.

Figure 4:
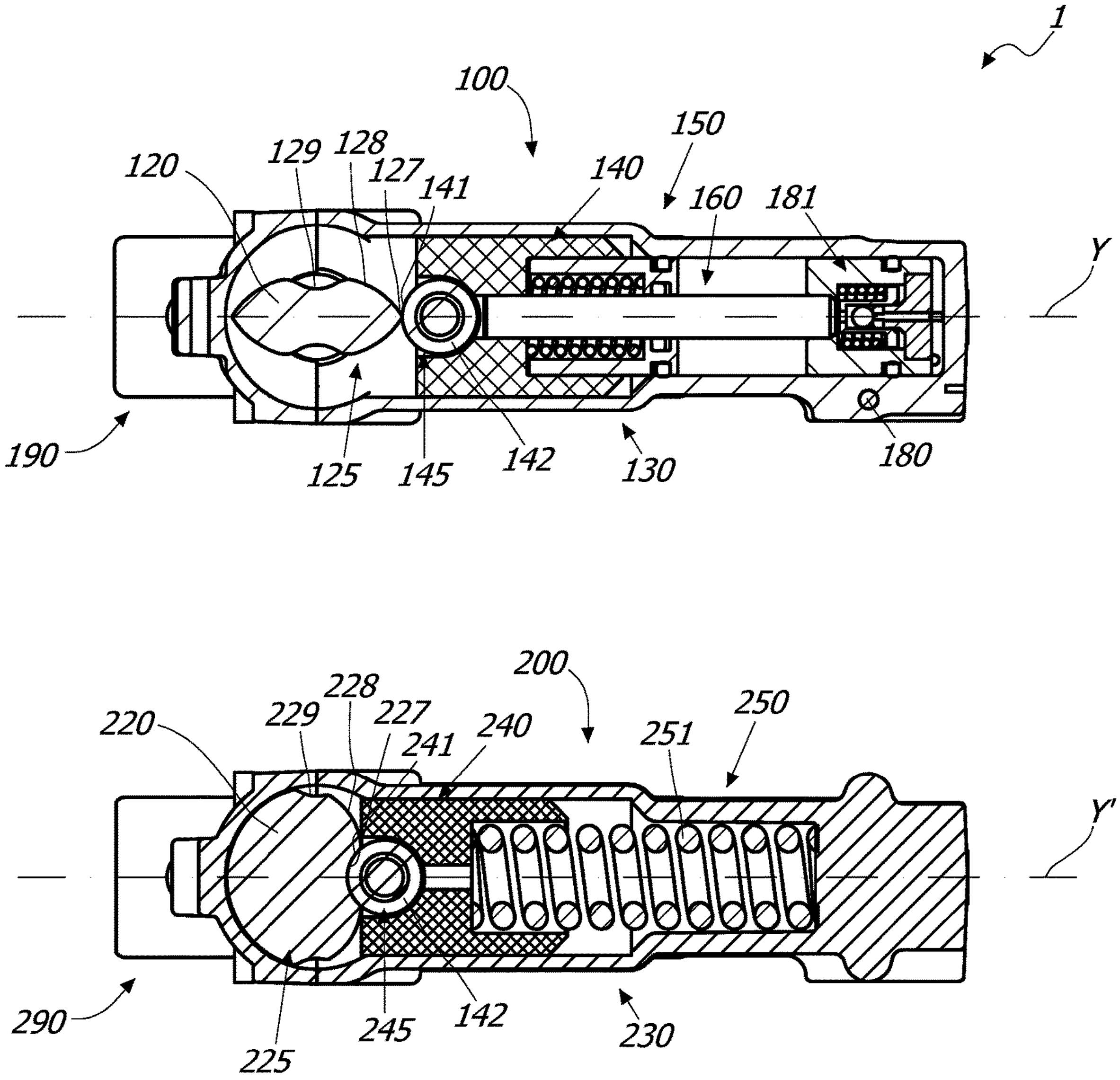
FIGS. 4, 5, 6 and 7 are schematic cross-sectional views of the hinges 100 and 200 with the respective fixing plates 190 and 290 are in different operating steps, respectively with an angle of mutual rotation of 0°, 30°, 60° and 90°.

In FIG. 4 and in FIG. 8, the slider 140 is in a position proximal to the wall 138 and the slider 240 is in a position distal from the wall 138, while in FIG. 7 and in FIG. 9 the slider 140 is in a position distal from the wall 138 and the slider 240 is in a position proximal to the wall 138.

Preferably, the pivot 120, 220 may include an operative surface 126, 226 defining the cam means 125, 225, while the slider element 140, 240 may include respective surfaces 141, 241 suitable to interact with the surfaces 126, 226 thus defining the cam follower means 145 245.

Preferably, the slider 140, 240 may comprise a cylinder 142 having an axis substantially perpendicular to the axis Y, Y' which includes the respective surface 141, 241.

In this manner, the action of the spring 251 will promote the sliding of the slider 240 toward the distal position, the corresponding rotation of the pivot 220, the corresponding rotation of the pivot 120 and the corresponding sliding of the slider 140 toward the proximal position. The hydraulic means 150 may dampen the sliding of the plunger 140 from the distal position to the proximal position.

In the event of the closure of the door A, of the spring 251 may not be constant, that is it may be maximum with the door A open and minimum with the door A closed, while the hydraulic means 150, depending on the configuration, may dampen the closing of the door A in a substantially constant manner.

Therefore, the surfaces 126 and 226 of the respective pivots 120 and 220 may be shaped so as to compensate for these imbalances so that the door A has a substantially constant rotation speed.

In general, depending on the configuration of the surfaces 126 and 226 or, depending on the configurations of the portions 128, 228, the door A may rotate with a first predetermined speed for at least one section of the rotation from the open position to the closed position and with a second predetermined speed for at least one second section of the rotation thereof between the door open position and the door closed position.

In greater detail, the surface 126 of the pivot 120 of the hinge device 100 and the surface 226 of the pivot 220 of the hinge device 200 may therefore be shaped so as to have a variable shape. Preferably substantially curved or convex.

In particular, the surface 126 of the pivot 120 of the hinge 100 and the surface 226 of the pivot 220 of the hinge device 200 may comprise, with an initial section 127, 227, a final section 129, 229 and a substantially convex intermediate operative section 128, 228.

The profile of the convex surfaces 128 and 228 may be mutually configured so that, upon the rotation of the door A, the variable action of the spring 251 is counteracted by the action of the hydraulic means 150.

In other words, the hinge device 200 may provide a torque which operates to close the door A, while the hinge device 100 may provide a torque which operates in an opposite manner, that is counteracting the torque 200 to brake the closing of the door A. The former torque may therefore be greater than the latter one.

The hinge devices 100 and 200 may be configured so that the resulting of the two opposite torques allows the movement of the door A with the predetermined speed, preferably but not exclusively constant, along at least one section of the rotation thereof from the open position to the closed position.

For example, the difference between the two torques may be constant over such section of the rotation thereof from the open to the closed position.

It is clear that such torques will not be constant during the rotation, given that the elastic means provide a variable torque upon the rotation of the door A, that is the rotation of the hinge body 230 and of the pivot 120.

For example, when the second torque increases, also the first torque may increase and, vice versa, when the second torque decreases the second torque decreases too.

It is clear that should there be required a different speed for closing the door for example incremental or decreasing, or for a fast and for a slow section, the torque provided by one or both hinges may be varied by acting on the means 150, 250, or preferably, on the cam means 125, 225. In particular, the shape of the surface 226, 126 of the latter may be varied.

Suitably, the cam 125, 225 and cam follower 145, 245 means may be mutually configured to provide such first and second torque.

In particular, the operative portions 128, 228 may be mutually configured so that the first and second torques are variable upon the rotation of the respective first and second hinge body 130, 230 and pivots 120, 220 along such section of the rotation thereof from the open to the closed position in order to allow the rotation with said at least one predetermined speed of the door A along such section of the rotation thereof from the open to the closed position.

For example, the surface 228 may be configured so that as the door closes, at a rotation angle of the pivot 220 there corresponds a significantly greater sliding of the slider 240. While the surface 128 may be configured so that the sliding of the slider 140 remains substantially constant or varies slightly during the closing of the door.

Below is the description of the system 1 with particular reference to the FIG. 4 to FIG. 7.

In particular, the pivot 120 may comprise the outer surface 126 with the initial angular section 127, the convex operative section 128 and the final concave section 129, while the pivot 220 may comprise the outer surface 226 with the initial concave section 227, the convex operative section 228 and the final concave section 229.

In FIG. 7 the door A is in the open position and the cam 125 may be at the concave section 129 while the cam 225 may be at the concave section 229. In this case the door A is therefore stable in a stop position. This position may correspond to the door open at 90° position.

When closing the door A, FIG. 6 and FIG. 5, the hinge body 130, 230 of both hinges 100, 200 may be moved so that the surface 141 is at the convex section 128, while the surface 241 is at the convex section 228.

Suitably, the sections 128 and 228 may have different convexities so that the decremental action of the spring 251 is compensated and the door A rotates with constant or predetermined speed, as described above.

In FIG. 4 the door A may be in the closed position. The hinge 100 may have the surface 141 in contact with the angular section 127, while the hinge 200 may have the surface 241 in contact with the concave section 227. The door A may therefore be in a stop position corresponding to the door closed position.

The door may be rotated by about 10° in order to overcome the door open stop position. In this case, the rotation of the door A may be controlled starting from 80°.

Similarly, with particular reference to FIG. 8 (door closed) and FIG. 9, the surface 126 may comprise a convex section 127, a second convex section 128 and a substantially flat section 129, while the surface 226 may comprise a substantially flat section 227, a second convex section 228 and a slightly convex section 229.

When the door A is in the closed position, the surface 241 abuts against the flat surface 227 so that the hinge 200 is stable and therefore the door A remains in the closed position. On the other hand, when the door A is in the open position, the surface 241 may abut against the substantially convex section 229 so that the hinge 100 returns to the closed position.

It is clear that the described above regarding the closing of the door A may be similarly provided for the opening of the door A.

Preferably, the pivot 120 and/or 220 may be substantially symmetrical so that the hinges 100 and/or 200 are ambidextrous.

Generally, it is clear that depending on the shape of the cam means 125 225, and of the control means 150, 250, the hinge 100 or 200 may behave differently, therefore a different law of motion and, as a result, the movement of the door A may be different.

Advantageously, the behaviour of the hinge 100 or 200 may be modified simply by replacing the cam means 125, 225, for example by replacing the pivot 120 or 220.

Furthermore, similarly, there may be provided a system 1 for the movement of the door A having different configurations depending on the preferences by providing different pivots 120, 220.

Due to these characteristics, the system 1 may be particularly versatile and at the same time simple, quick and cost-effective to produce.

Figure 32:
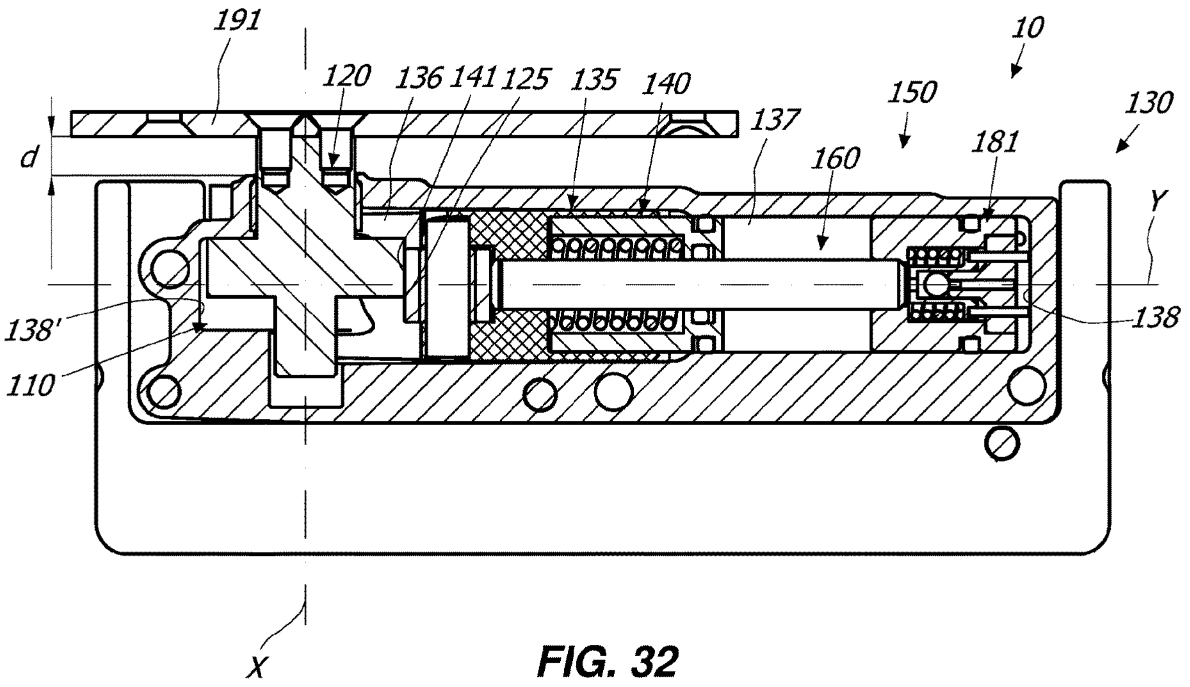
Figure 33:
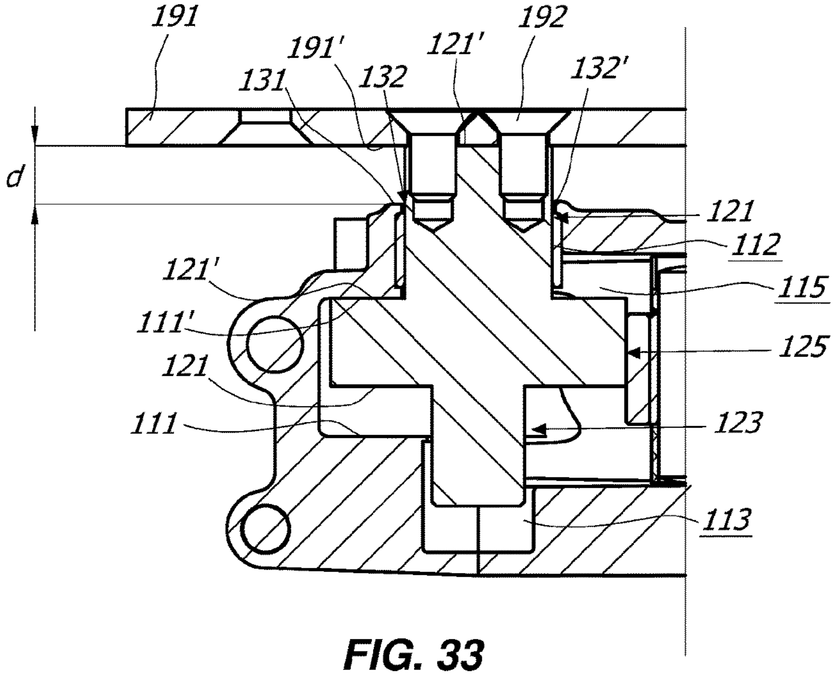

According to a particular embodiment of the invention, the distance d between the hinge 100 and the fixing plate 190 may be variable between a minimum distance d (FIG. 30) and a configuration in which the distance d is maximum (FIG. 32).

The maximum distance d may be greater than 5 mm, preferably of about 8 mm, while the minimum distance d may be less than 5 mm, preferably smaller than 1 mm.

In any case, the maximum variation of the operative distance may be comprised between 1 mm and 10 mm, preferably it may be about 7 mm.

In particular, the hinge 100 and the fixing plate 190 may slide mutually along the axis X, so as to compensate for possible gaps between the frame and the door during the assembly.

In greater detail, the hinge body 130 may comprise an upper wall 131 facing the fixing plate 190. The latter may comprise a plate 191. The maximum variation in the operative distance d may therefore be the distance between the upper wall 131 and the plate 191.

The hinge 100 may comprise a pivot 120 and a hinge body 130. The pivot 120 may be engaged with the hinge body 130 and it may be fixed with the fixing plate 190. On the other hand, the hinge body 130 may comprise a seat 110 for the pivot 120.

The pivot 120 and the hinge body 130 may be mutually rotatably coupled to each other to rotate around the axis X1 between at least one operative position corresponding to the open position of the closing element and an operative position corresponding to the closed position of the closing element.

Preferably, the pivot 120 may be integrally coupled with the fixing plate 190. For example, the pivot 120 may comprise an end portion 121' which may be integrally coupled with the plate 191, for example by means of one or more screws 192, while the hinge body 130 may be coupled with the closing element A.

Suitably, the pivot 120 and the seat 110 may be mutually configured so as to mutually slide along the axis X. Preferably, the pivot 120 and the hinge body 130 may slide for a section substantially equal to the distance d.

For example, the end 121' of the pivot 120 may protrude from the wall 131 of the hinge body 130 for a length equal to or greater than the maximum variation in the distance d. The pivot 120 may therefore be movable between an extended configuration (FIG. 32) in which the distance d is maximum and a retracted position (FIG. 30) in which the distance d is minimum.

Suitably, the hinge body 130 may comprise a through opening 132 to allow the sliding of the pivot 120. In greater detail, the wall 131 may comprise such a through opening 132.

The pivot 120 may therefore comprise at least one portion 121 passing through the opening 132 and slidable therein between the retracted configuration and the extended configuration. The portion 121 may include the end 121'.

Preferably, when the pivot 120 is in the retracted configuration, the portion 121 and the part 131 may be substantially flush, and the minimum distance d may be particularly small. For example, it may be less than 1 mm. Possibly, when the pivot 120 is in the retracted configuration, the wall 131 and the plate 191 may be in contact and the distance d may be substantially equal to zero. In this case, the minimum distance d may be small, and that is close to zero, while the maximum operative distance d may be substantially equal to the maximum variation of the sliding.

It is clear that the distance d may preferably be considered between the surface 131' of the wall 131 at the opening 132 and the surface 191' of the plate 191.

The seat 110 and the pivot 120 may be mutually configured to avoid mutual disengagement.

Suitably, the seat 110 may comprise a pair of opposite abutment surfaces 111, 111' designed to act as abutment for the pivot 120. The latter may comprise corresponding opposite abutment surfaces 122, 122' designed to abut against the corresponding surfaces 111, 111'.

When the pivot 120 is in the retracted configuration, the surfaces 111 and 122 may be in abutment position while the surfaces 111' and 122' may be spaced apart, while when the pivot 120 is in the extended configuration, the surfaces 111 and 122 may be spaced apart while the surfaces 111' and 122' they may be in abutment position.

Suitably, means for guiding the sliding of the pivot 120 between the extended and retracted position and means for guiding the rotation of the pin around the axis X, may be provided for.

The seat 110 may comprise a portion 112 and a portion 113 suitable to guide the pivot 120 in rotation and to guide it to slide with respect to the axis X. In particular, the portion 112 may comprise or consist of the opening 132. In other words, the side wall 132' of the latter may define the means for guiding the portion 121 of the pivot 120 slidably and rotatably.

On the other hand, the pivot 120 may comprise a portion 123 opposite the portion 121 which may remain at the portion 113 of the seat 110.

Preferably, the portions 121 and 123, as well as the portions 112 and 113, may be substantially cylindrical-shaped and they may have substantially the same diameter. In this manner, the portions 121 and 123, 112 and 113 may mutually interact to guide the pivot 120 in rotation and translation with respect to the axis X1.

Preferably, the hinge 100 may be an automatic and/or control hinge.

In particular, the pivot 120 may comprise cam means so that the rotation thereof around the axis X1 promotes the sliding of a slidable element 140. Suitably, the hinge 100 may therefore comprise means for damping, promoting, hindering or freely allowing the sliding element 140 to slide.

Figure 30:
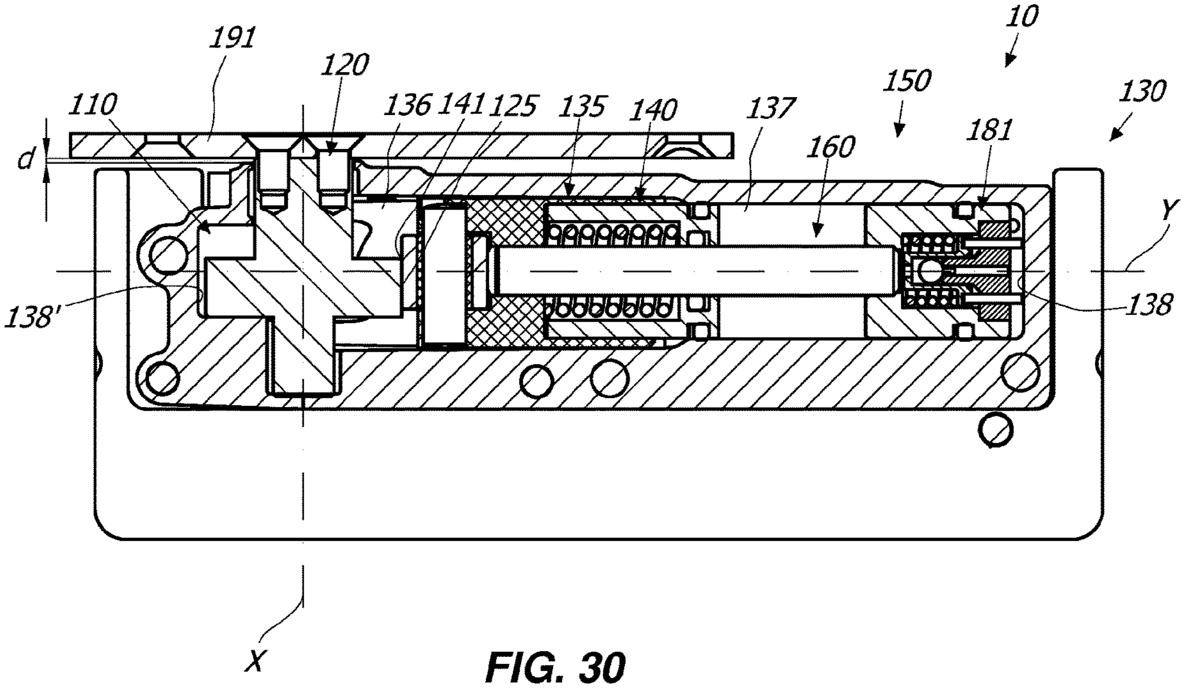
FIGS. 30 and 32 are a cross-sectional view of some details of the hinge 100 with the fixing plate 190 respectively in the proximal and distal position, with in FIGS. 31 and 33 showing an enlarged view respectively of FIG. 30 and FIG. 32.
Figure 31:
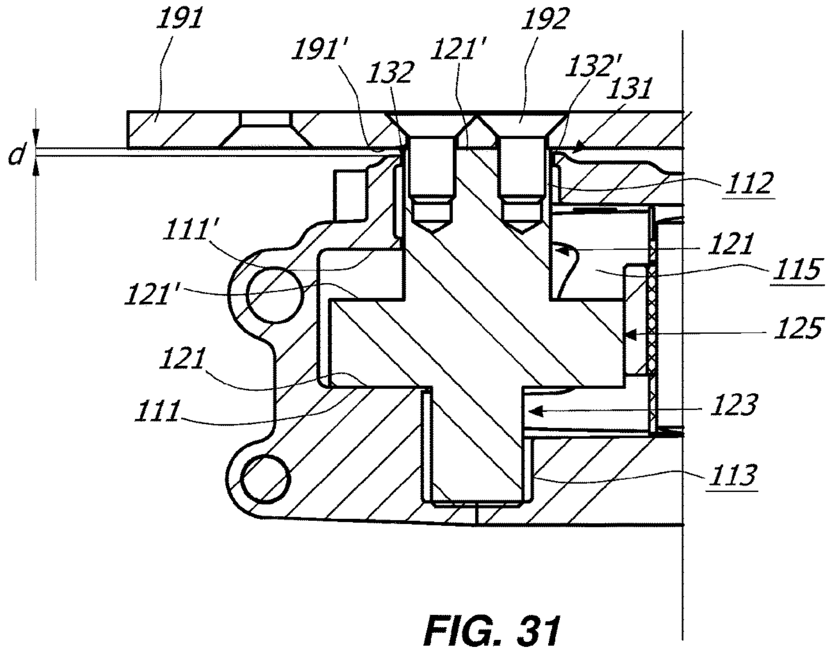

The hinge 100 may be of the mechanical, hydraulic type or it may comprise both mechanical means and hydraulic means. For example, FIG. 30 and FIG. 30 show a hinge 100 with hydraulic means 150 for controlling and damping the sliding of the sliding element 140.

Suitably, therefore, the pivot 120 may comprise a central portion 125 interposed between the portions 121 and 123 which may define the cam means.

On the other hand, the seat 110 may comprise a corresponding central portion 115, interposed between the portions 112 and 113 for housing the central portion 125.

Advantageously, such central portion 115 may comprise the abutment surfaces 111 and 111'. On the other hand, the central portion 125 of the pivot 120 may comprise the respective abutment surfaces 122 and 122'.

Preferably, the surfaces 111 and 111', 122 and 122' may be substantially transversal or perpendicular to the axis X.

Advantageously, the distance between the abutment surfaces 111, 111' may be greater than the distance between the surfaces 122 and 122'. In this manner, the portion 125 may slide along the axis X1 in the portion 115 of the seat 110.

Preferably, the difference between the distance between the abutment surfaces 111, 111' and the distance between the surfaces 122 and 122' may define the maximum variation of the operative distance d.

Suitably, the slider element 140 may slide along an axis Y substantially perpendicular to the axis X1. The slider element 140 may comprise an operative surface 141 designed to interact with the portion 125 of the pivot 120 so that the rotation of the latter promotes the sliding of the former and vice versa.

In other words, the surface 141 may define the cam follower means 145.

Advantageously, the surface 141 may extend substantially parallel to the axis X1 for a length such that it interacts with the cam elements 125 in any operative position of the pivot 120 between the retracted and extended position.

Preferably but not exclusively, the system 1, as schematically shown in FIG. 1, may comprise the hinge 100 which allows the adjustment of the distance d and therefore the installation thereof at the unevenness.

Described below are some embodiments of a hinge 100 which may be used in the system 1 or it may be used in any manner so as to move a closing element, for example a door A.

As better described below, the hinge 100 may be hydraulic and it may comprise a valve assembly 181 configured to open in the event of excessive pressure (so-called overpressure valve), and/or to prevent the backflow of the working liquid (so-called check valve) and/or to allow an increase in the fluid flow in proximity of the closing of the door A (so-called final snap). In other words, advantageously, a single particularly compact valve assembly 181 may provide one or more of the functions described above.

The hinge device 100 may comprise the hinge body 130 which may include a working chamber 135. Preferably, the working chamber 135 may comprise a portion 136 for housing the pivot 120 therefore defining the seat 110, and an elongated portion 137 defining the axis Y for housing a slidable slider element 140.

In particular, the chamber 135 may comprise a pair of opposite bottom walls 138, 138'. Preferably, the portion 136 may comprise the wall 138' while the portion 137 may comprise the wall 138.

The slider 140 may therefore slide between a position distal to the wall 138 (FIG. 7, FIG. 9, FIG. 14 and FIG. 28) and a position proximal to the wall 138 (FIG. 4, FIG. 8, FIG. 10 and FIG. 24).

The pivot 120 may comprise the cam means 125 while the slider 140 may comprise the cam follower means 145 so that the rotation of the former around the axis X1 promotes the sliding of the latter along the axis Y.

Suitably, a plunger element 160 which may slide in the chamber 135 along the axis Y may be provided for.

Possibly, the plunger element 160 may be connected to the slider 140 so as to slide with the latter. Possibly, the slider 140 may comprise or consist of the plunger element 160.

In any case, the plunger element 160 may be operatively connected with the cam follower means 145 so that the rotation of the pivot 120 promotes the sliding thereof and vice versa.

Advantageously, a partitioning element 1000 may be provided for between the portion 137, which will define the hydraulic portion of the hinge, and the seat 110, which will define the dry mechanical one.

As a result, the pivot 120 will dry work in the seat 110, so as to be able to move vertically to adjust the distance d without leakage of hydraulic working fluid, in particular oil.

For example, the partitioning element 1000 may be a sealing plug. Possibly, the partitioning element 1000 may be fixed with respect to the hinge body 130 and be cylindrical-shaped with an annular seat for a return spring 1010 acting on the cylinder 1020.

This will allow to promote the return of the plunger 160 from the proximal position to the distal position.

According to a preferred but not exclusive embodiment, the plunger element 160 may comprise a stem 161 operatively connected to the slider element 140 to slide therewith, and a head 165 slidable in the chamber 135.

The plunger 160 and the slider 140 may be integrally connected, for example by means of a pin, may be forced against each other by means of elastic means or suitable means 149 may be provided for the operative coupling of the slider 140 and of the plunger 160.

For example, such connection may be obtained according to the teachings of patent applications WO2018116275 and WO2020044143 on behalf of the Applicant in question.

As shown in the attached drawings, the slider 140 may partition the chamber 135 into a first half-chamber 136 for the plunger 120 and into a second half-chamber 137 for the plunger 160.

Suitably, the portion 137 of the chamber 135 may define a closed chamber which may contain a working fluid, for example oil.

The plunger element 160 may therefore slide in the chamber 137 between an operative end-of-stroke position in which the head 165 is proximal to the bottom wall 138 and an opposite operative position in which the head 165 is distal from the bottom wall 138 corresponding to the distal position and proximal to the wall 138 of slider 140 described above.

The head 165 may be sealingly inserted into the chamber 137 in order to partition the latter into at least one first and second variable volume compartment 176, 177.

In this manner, when the plunger element 160 is in the proximal position, the compartment 176 may have a maximum volume and the compartment 177 may have a minimum volume, while when the plunger element 160 is in the distal position the compartment 176 may have a minimum volume and the compartment 177 may have a maximum volume.

The hinge 100 may therefore comprise one or more hydraulic circuits to allow the working fluid to flow between the compartments 176, 177 upon the sliding of the plunger element 160 and therefore upon the rotation of the hinge body 130 and of the pivot 120 between the door open and closed position.

In particular, the hinge 100 may comprise at least one circuit 171 for placing in fluidic communication the compartments 176, 177 so that the fluid flows between the compartments 176 and 177 when the plunger element 160 moves between the proximal position and the distal position, that is between the open and closed positions of door A.

Preferably, this circuit 171 may be of the per se known type and it may comprise at least one duct arranged inside the hinge body 130 having an opening in the compartment 176 and an opening in the compartment 177.

Although not shown in the attached figures, means 180 may be provided for controlling the flow of the working liquid in the circuit 171. For example, a calibrated opening may be provided for so as to adjust the flow rate of the working fluid flowing through and therefore the sliding of the plunger element 160.

Advantageously, a circuit 172 may also be provided for selectively fluidically connecting the compartments 176, 177 so that the working fluid flows from the compartment 177 to the compartment 176 when the plunger element 160 passes from the distal position to the proximal position, upon closing the door A.

Suitably, this circuit 172 may be inside the plunger element 160. Preferably, this circuit 172 may pass through the head 165 of the plunger 160.

The hinge 100 may further comprise valve means 181 acting on the circuit 172 to selectively allow or prevent the working fluid from flowing therethrough.

Possibly, the head 165 may comprise both the circuit 172 and the valve means 181.

It is clear that should such hinge 100 be used in the system 1 described above, the hydraulic circuit 171 and/or 172, same case applying to the valve means 181 acting thereon may define the means 150 for controlling the sliding of the slider 140.

As better explained hereinafter, depending on the configuration of the valve means 181, the latter may act on the circuit 172 as a check valve, as an overpressure valve and/or as a final snap.

The figures from FIG. 11 to FIG. 29 show different configurations of the circuit 172 and of the valve means 181.

It is clear that such valve means 181 may be used in any hinge 100, and in particular, regardless of the configuration of the cam and cam follower means 125, 145 described above and/or regardless of the possible sliding of the pivot 120 along the rotation axis X1 thereof.

Below is the description of a particular embodiment of the valve means 181, for example shown in FIG. 10 to FIG. 15, FIG. 22 to FIG. 23, and FIG. 24 to FIG. 29.

The circuit 172 may comprise a duct 173 which may have an opening 175' at the compartment 177 and an opposite opening 175.

Preferably, the duct 172 may comprise the opening 175' fluidically connected with the compartment 177 and the opening 174" fluidically connected with the compartment 176.

The hinge 100 may further comprise a disc-shaped element 166 with an internal through hole defining the duct 173 and a shutter 184, for example a ball, for acting on the end opening 175 of the duct 173. Preferably, the opening 175 may be circular and may have a diameter smaller than that of the ball 184.

The circuit 172 may comprise a chamber 174. Preferably, the shutter 184 can be arranged in the chamber 174.

In particular, the shutter 184 may be movable between a closed position in proximity of the opening 175 in which it shuts the latter and prevents the working fluid from flowing through the duct 173, and an open position distant from the opening 175 in which it allows the working fluid to flow through the duct 173.

Suitably, means 189 configured to force the shutter 184 to close may be provided for. The means 189 may for example comprise or consist of a spring.

In this manner, the valve means 181 may be normally closed, and the oil may be prevented from flowing from the compartment 177 to the compartment 176 through the circuit 172, therefore defining a check valve.

Advantageously, an annular element 185 arranged in the chamber 174 may be provided for and it is interposed between the shutter 184 and the spring 189. Preferably, the annular element 185 may be fitted on a cylindrical portion 166" of the disc-shaped element 166.

Possibly, the annular element 185 may be configured to guide the shutter 184 between the open and closed positions. For example, the annular element may comprise an inner portion that is substantially cylindrical and coaxial with the axis Y to guide the sliding of the shutter 184 along the same axis.

The chamber 174 may therefore comprise an abutment wall 174' for abutting against the spring 189, while the annular element 185 may comprise a corresponding annular relief 186. The spring 189 may therefore remain interposed between the part 174' and the surface 186' of the relief 186 to force the annular element 185 against the ball 184 and therefore against the opening 175.

The annular element 185 may therefore slide along the axis Y between a position distal from the opening 175 in which the shutter 184 allows the fluid to flow through and a position proximal to the opening 175 in which the shutter 184 prevents the fluid from flowing through.

The chamber 174 may comprise an opening 174" to allow the fluid to flow through. In particular, the circuit 172 may therefore comprise the duct 173 with the opening 175' and 175, the chamber 174 and the opening 174".

The annular element 185 may cooperate with the ball 184 to selectively prevent or allow the fluid to flow through the circuit 172.

Should the pressure inside the compartment 177 be particularly high, the fluid may flow into the duct 173 and force against the ball 184. When the force exerted is greater than that exerted by the spring 189, the ball 184 may move away from the opening 175 and therefore allow the working fluid to flow through the opening 175.

The fluid may therefore flow through the opening 174" into the compartment 176. Such opening 174" may for example be obtained on the stem 161 of the plunger 160.

In this case, the valve means 181 may therefore be configured to open upon exceeding a predetermined pressure value, therefore acting as an overpressure valve. This overpressure value may depend on the resistance of the spring 189.

According to a particular aspect of the invention, as shown in the figures from FIG. 10 to FIG. 15, the disc-shaped element 166 may comprise one or more through openings 167, preferably a pair of through openings 167 designed to house a corresponding pair of pins 168. The openings 167 may be substantially parallel to the axis Y and/or it may be coaxial thereto.

The pins 168 may have an end 169' designed to interact with the annular element 185 and an opposite end 169 designed to interact with the bottom wall 138. In particular, the pins 168 may have a length substantially greater than the thickness of the disc-shaped element 166.

The through holes 167 may be configured so that once the pins 168 have been inserted thereinto, the ends 169' are at the surface 186" of the relief 186 opposite to the surface 186'.

Figure 11:
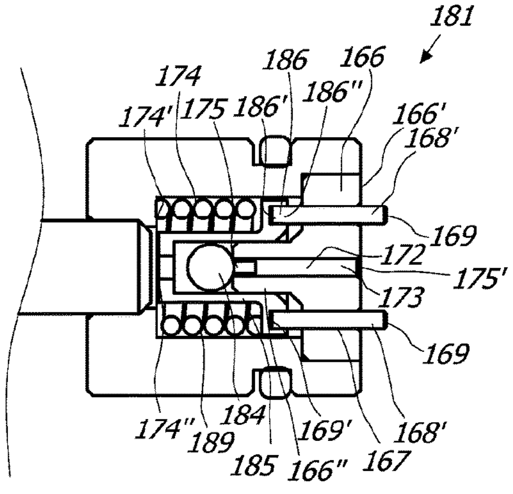
Figure 12:
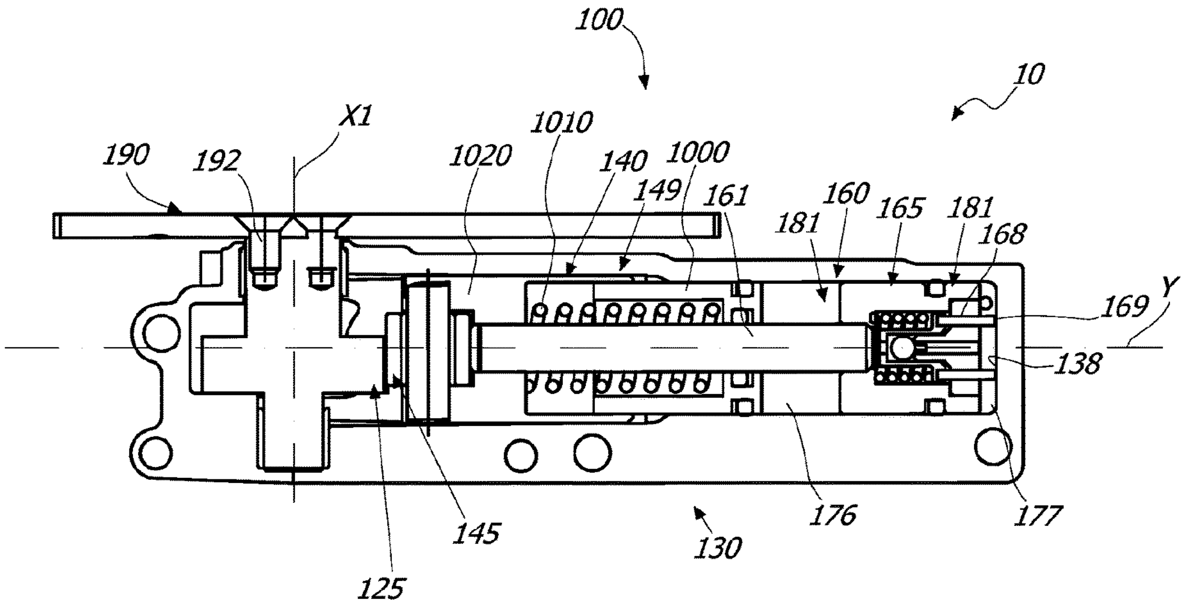
Figure 13:
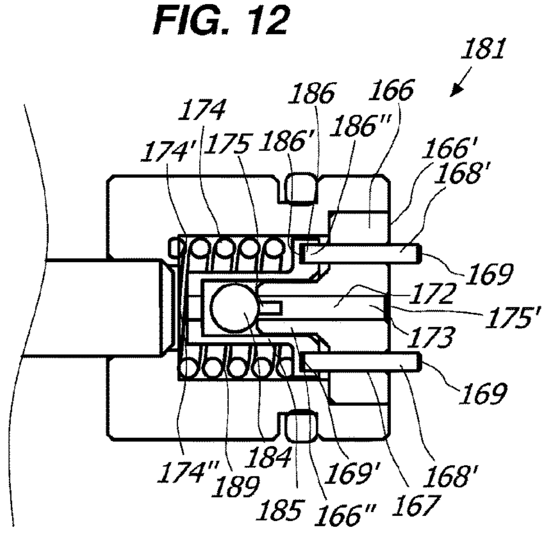
Figure 14:
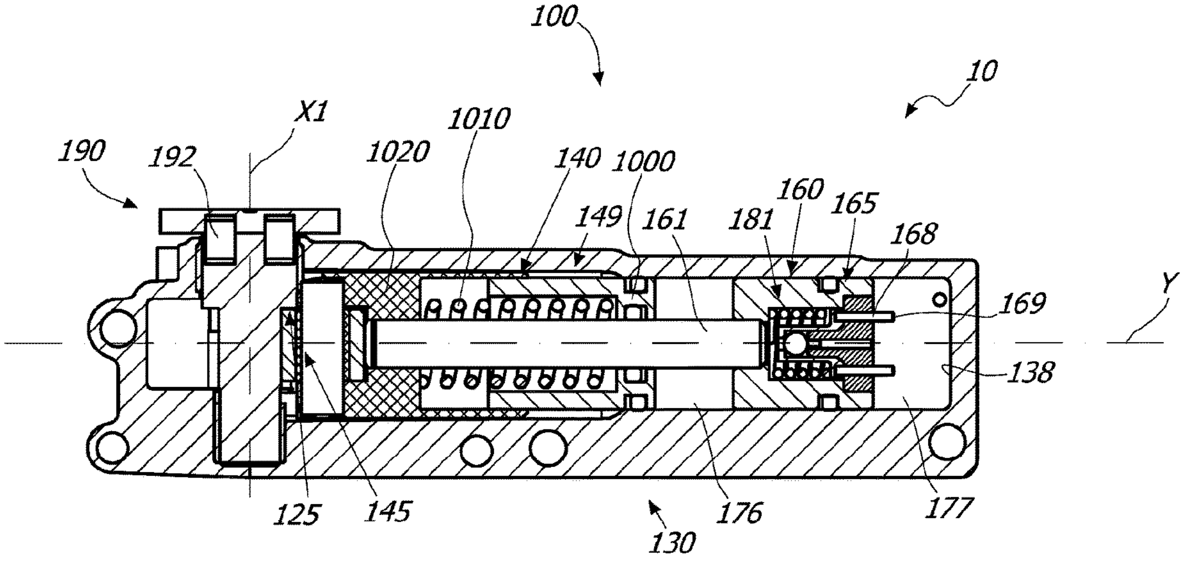
Figure 15:
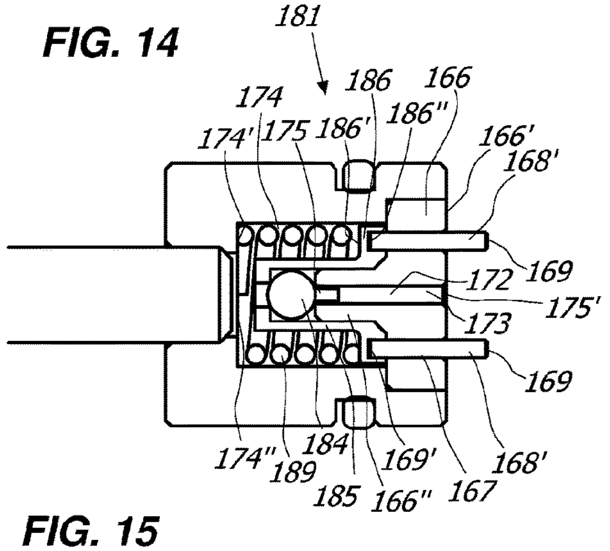
Figure 16:
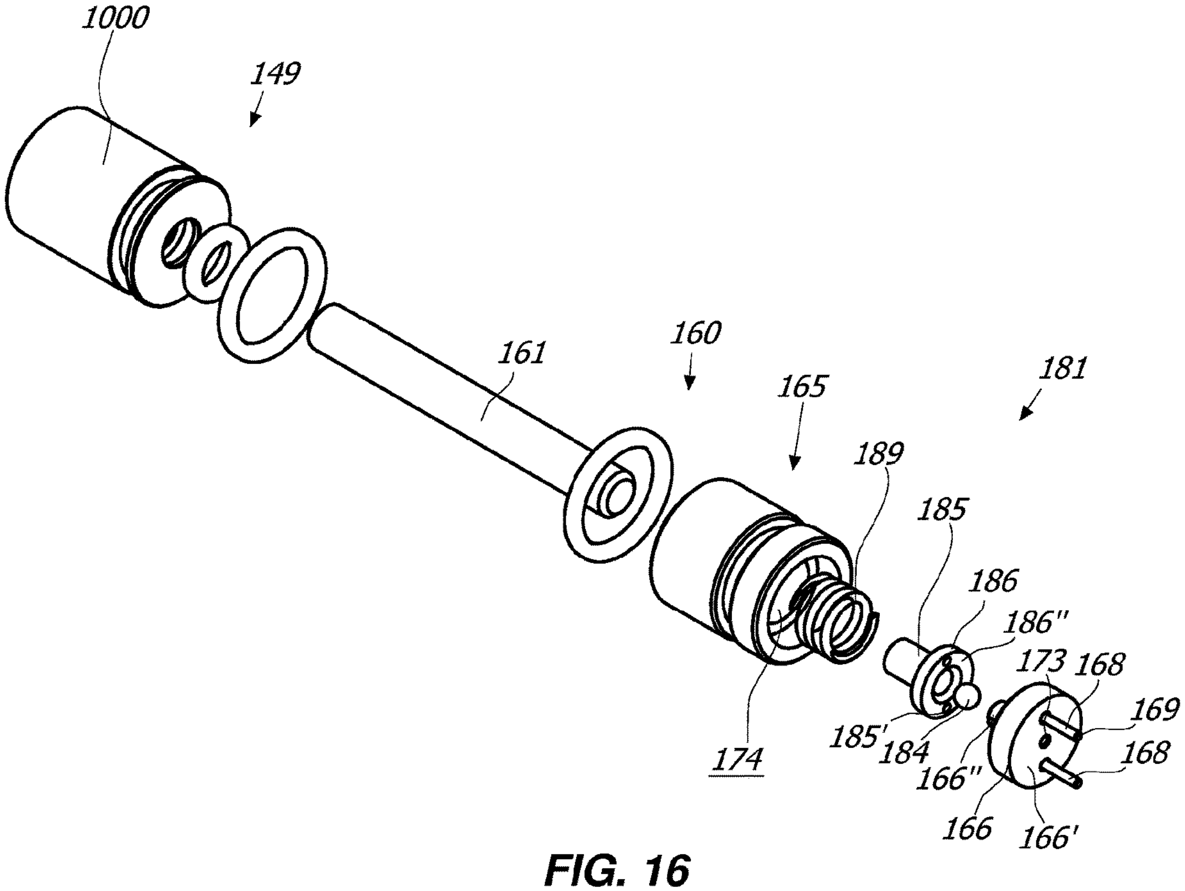
FIG. 16 is an exploded view of some details of the valve means 181 of the hinge 100 of FIG. 12.
Figure 17:
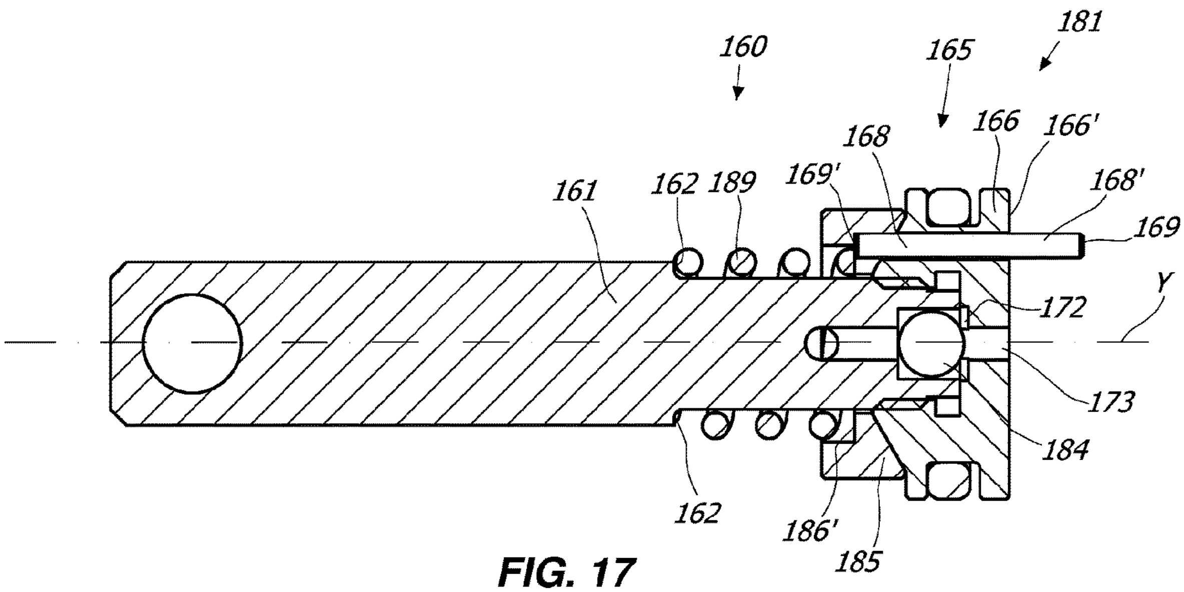
FIGS. 17 and 19 are a cross-sectional view of a different embodiment of the valve means 181 with FIGS. 18 and 20 showing an enlargement of some details respectively of FIGS. 17 and 19.

In the embodiment shown in FIG. 11, FIG. 13 and FIG. 15, there are present two pins 168 passing through the peripheral openings 167. Preferably, the pins 168 may have a diameter substantially equal to that of the openings 167 so that the oil flows only through the duct 173.

Possibly, the annular element 185 may comprise a blind hole 185' for the end 169' of the pin 168. The blind hole 185' may include the surface 186". In particular, the end 169' of the pin 168 may be inserted into the hole 185' by interference so that the pin 168 is coupled with the annular relief 185 and moves integrally therewith.

It is clear that any number of pins 168 and peripheral openings 167 may be provided for. Preferably, three pins 168 which are angularly equally spaced so as not to promote the rotation of the head 165 in a plane perpendicular to the sliding axis Y thereof may be provided for.

Figure 22:
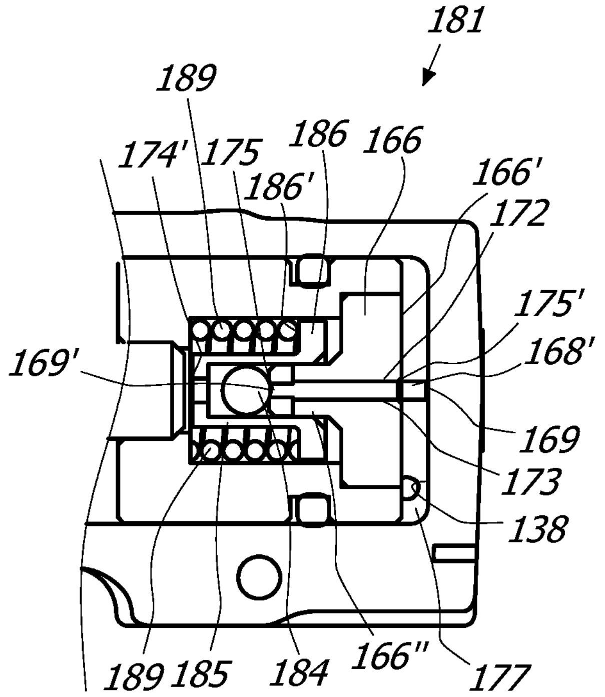
FIGS. 22 and 23 are a cross-sectional view of some enlarged details of hinge 100 of FIG. 4 with a different embodiment of the valve means 181.
Figure 23:
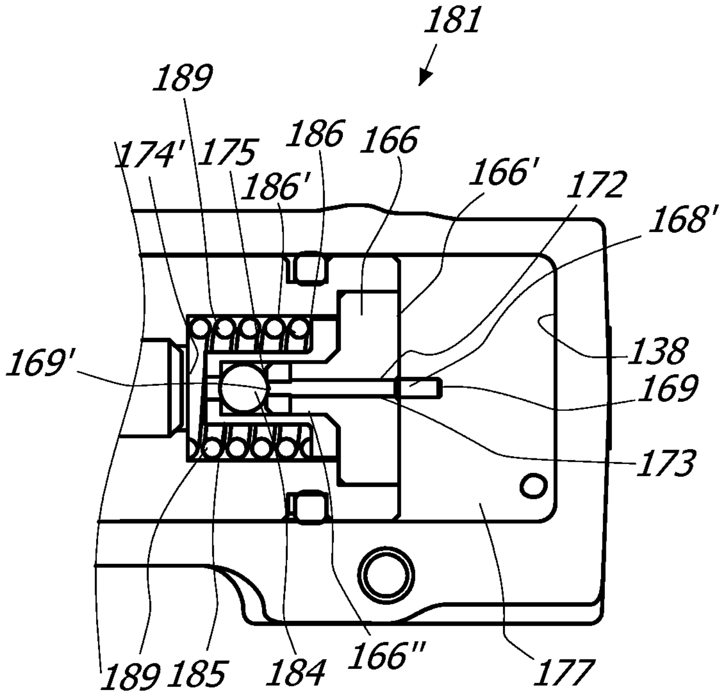
Figure 25:
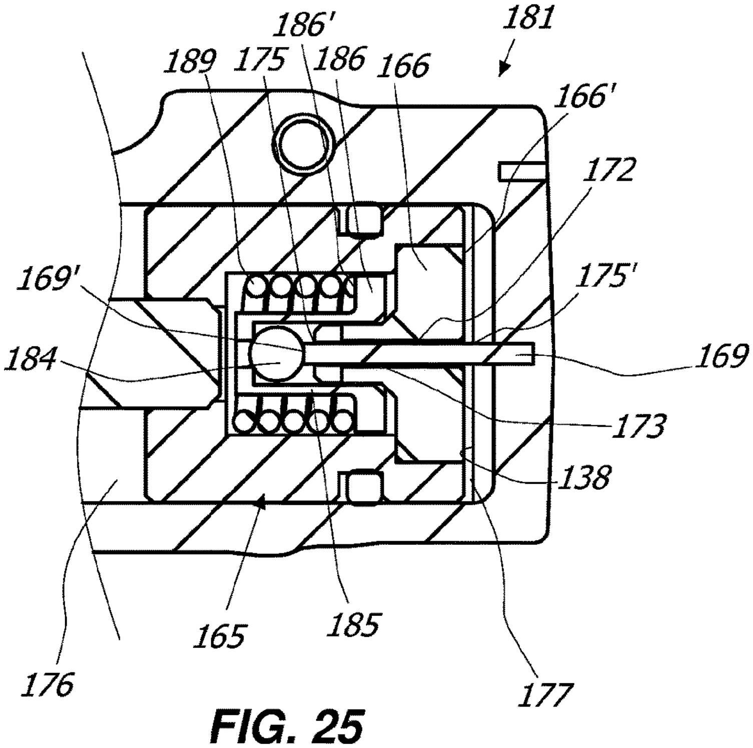
Figure 26:
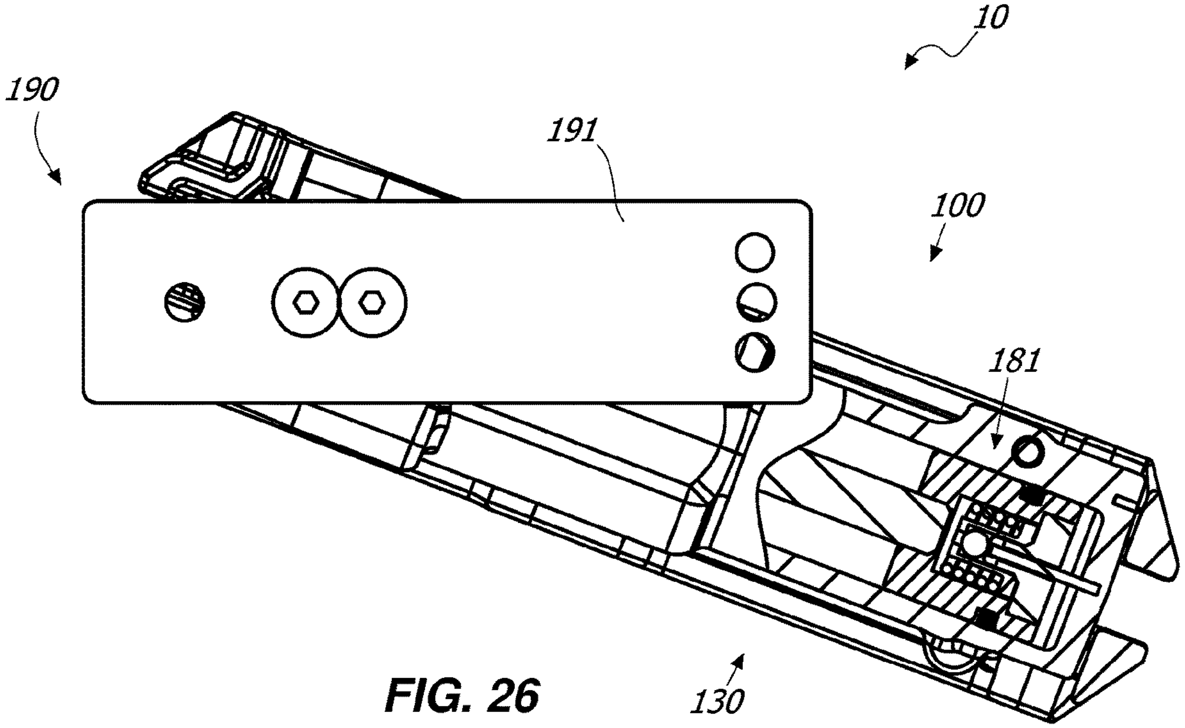
Figure 27:
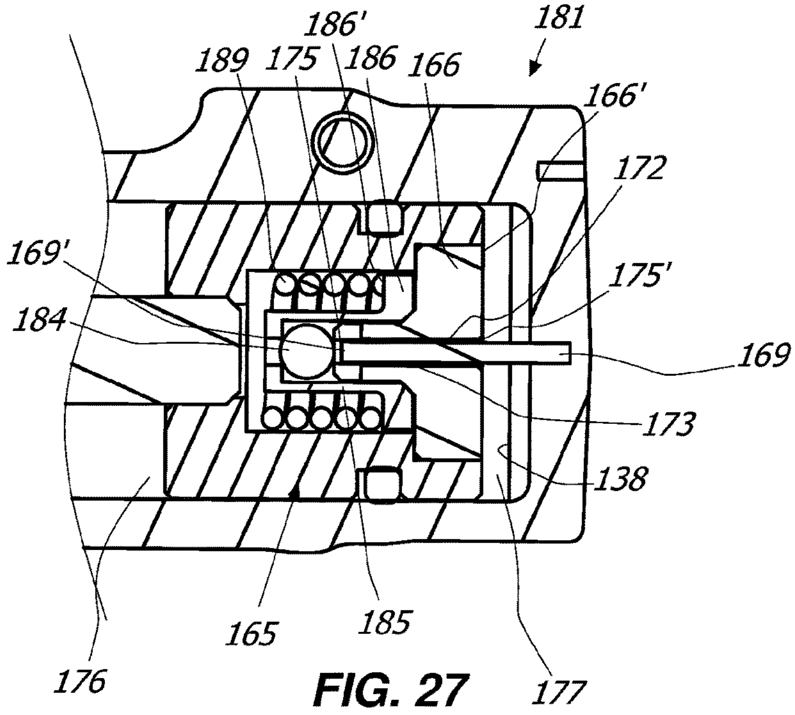
Figure 28:
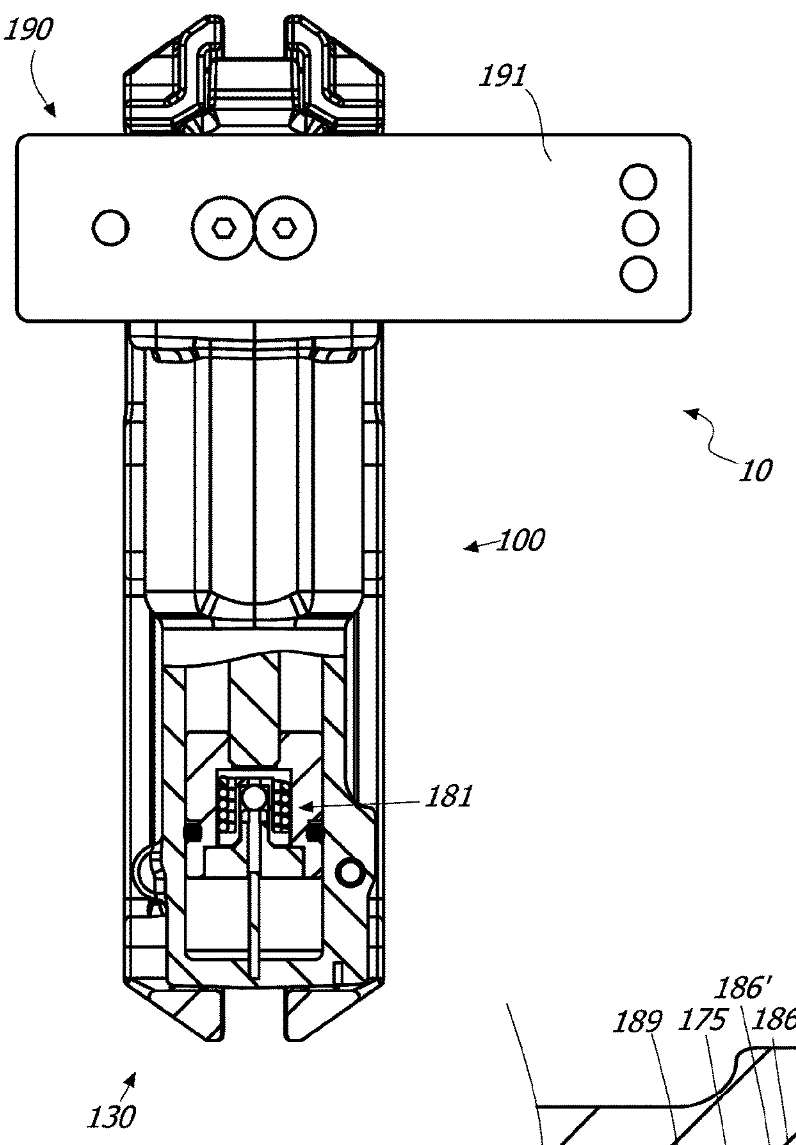
Figure 29:
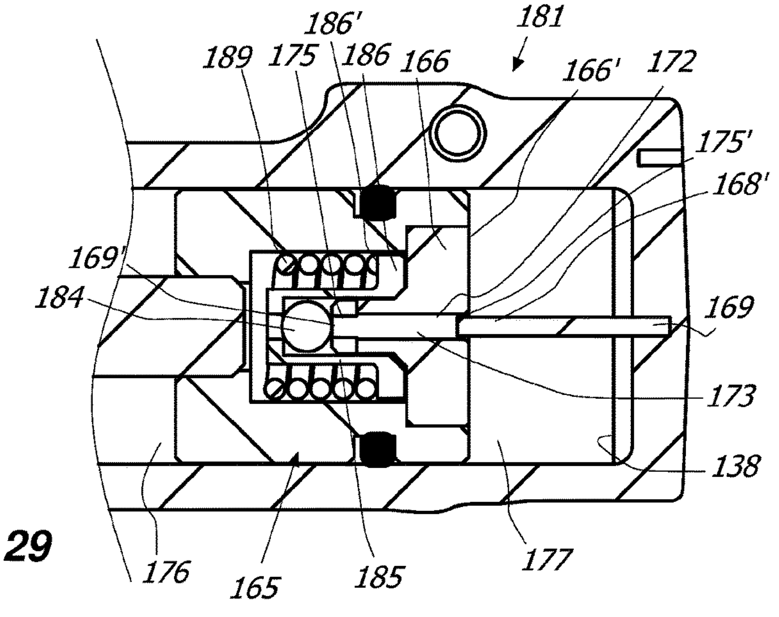

On the other hand, in the embodiment shown in FIG. 22 and FIG. 23 and in the one shown in FIG. 25, FIG. 27 and FIG. 29 a single pin 168 is present. In this case, the pin 168 may pass through the duct 173 so that the end 169' thereof is inside the duct 173 and abuts against the ball 184 when the opposite end 169 abuts against the wall 138. In other words, the duct 173 may therefore define the through openings 167.

In this case, the pin 168 may have a diameter substantially smaller than the diameter of the hole 173 so that the oil can flow through the interspace between the latter up to the opening 175. In other words, the circuit 172 may include such interspace.

In particular, in the embodiment shown in FIG. 22 and FIG. 23, the end 169' of the pin 168 is fixed with the disc-shaped element 166, preferably at the annular portion 166" thereof, so that the pin 168 slides with the head 165, while in the embodiment shown in FIG. 25, FIG. 27 and FIG. 29, the end 169 of the pin 168 may be fixed to the wall 138 so that the pin 168 remains substantially stationary upon the sliding of the head 165.

The end 169 may be fixed in the wall 138 in a per se known manner, for example by interference.

Figure 18:
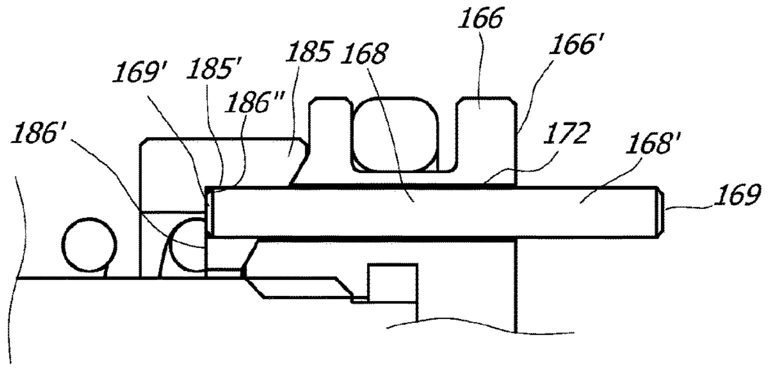
Figure 19:
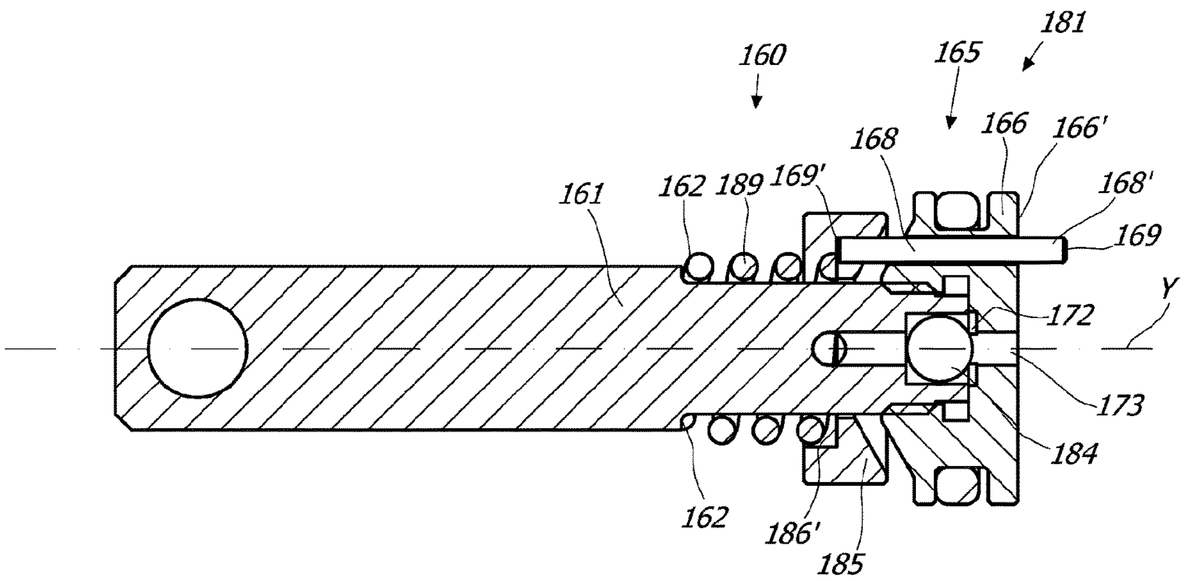
Figure 20:
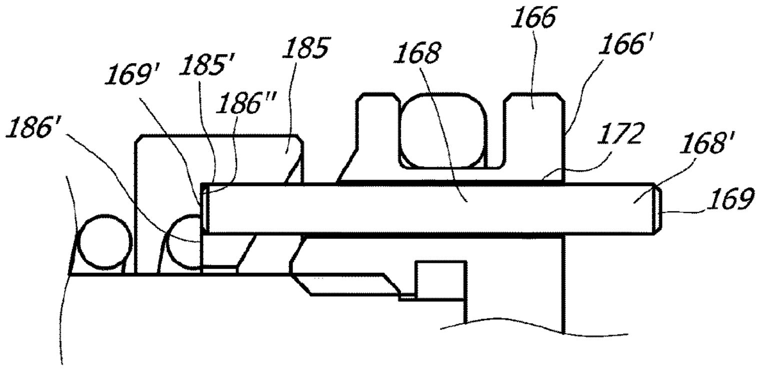
Figure 21:
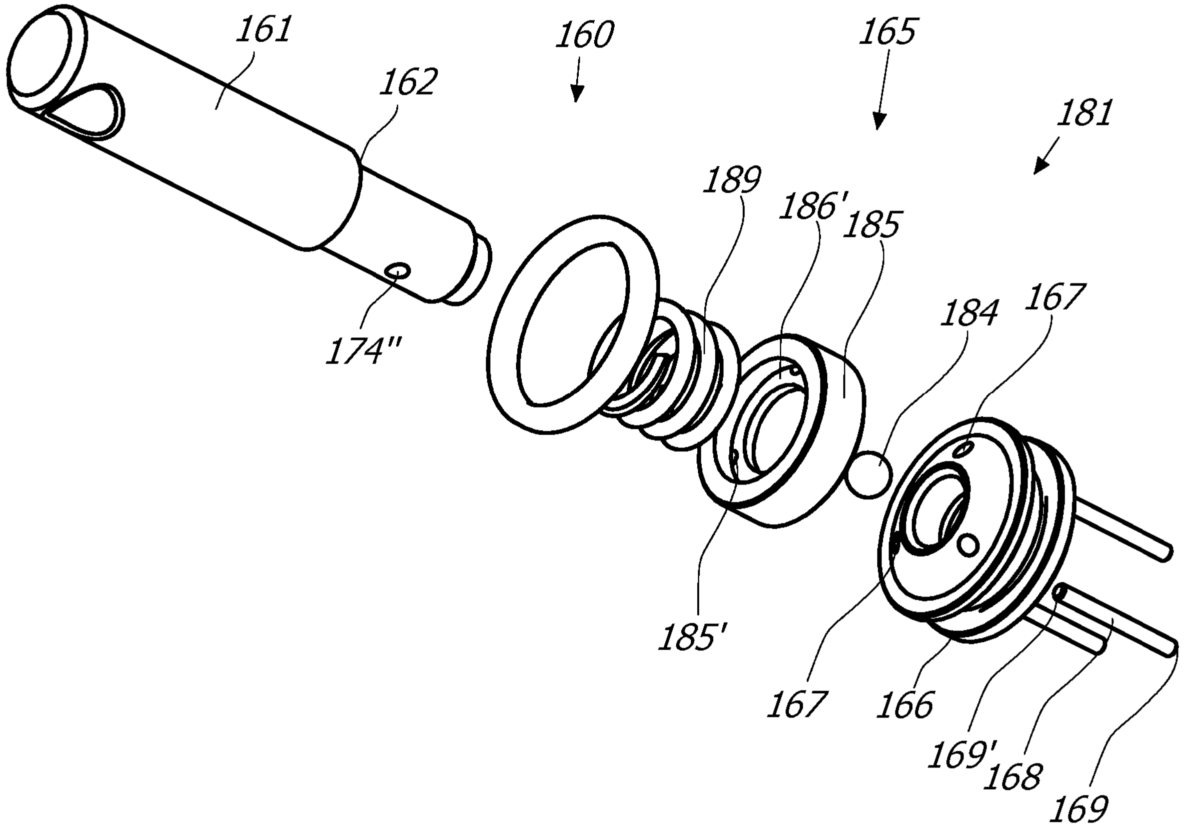
FIG. 21 is an exploded view of some details of the valve means 181 of the hinge 100 of FIG. 17.

On the other hand, according to a different embodiment shown in FIG. 18 and FIG. 20, the stem 161 may comprise an annular relief 162 which may therefore include the abutment surface 174" for the spring 189. Furthermore, the disc-shaped element 166 may comprise one or more peripheral through openings 167 for the pin 168. Possibly, the annular element 185 may comprise a blind hole 185' for the end 169' of the pin 168. The blind hole 185' may include the surface 186" and it may be at the one or more through openings 167.

Suitably, the pin 168 may have a diameter substantially smaller than the diameter of the openings 167 so that the oil can seep into the interspace between the latter. In particular, when the annular element 185 is spaced apart from the disc-shaped element 166 (FIG. 20), the oil may seep into the interspace between the pin 168 and the through hole 167 and flow out through the opening 174" in the stem 161. On the other hand, when the annular element 185 abuts against the disc-shaped element 166 (FIG. 18) the oil cannot flow out from the compartment 177 to the compartment 176.

It is therefore clear that the circuit 172 may include both the interspace and the duct 173.

Therefore, when the end 169 of the pin 168 abuts against the wall 138, the pins 168 may promote the moving away of the annular element 185 from the disc-shaped element 166 and therefore they may allow the oil to flow out from the compartment 177 to the compartment 176 through the circuit 172 therefore defining the function of final snap of the valve means 181 as better described below.

Furthermore, in this case, the spring 189 may act both against the annular element 185, which may therefore act as a shutter as described above, and against the ball 184. This may allow to obtain the check function of the valve means 181.

Lastly, in case of overpressure, the oil may flow into the duct 173 and force the ball 184 to open, therefore allowing the overpressure function of the valve means 181.

In any case, when the plunger 160 is in a position distal from the wall 138, the valve means 181 may be normally closed thanks to the action of the spring 189 (FIG. 15, FIG. 18, FIG. 23 and FIG. 29).

Suitably, when the valve means 181 are closed, the pins 168 may have a portion 168' protruding from the disc-shaped element 166. In particular, the pins 168 may protrude with respect to the surface 166' of the disc-shaped element 166 facing the bottom wall 138.

Upon the movement of the plunger element 160 toward the bottom wall 138, the end 169 of the pin or pins 168 may interact with the bottom wall 138, that is abut thereagainst.

Such position of the plunger element 160 may correspond to a predetermined angle α. Such angle α may vary according to the length of the portion 168' of the pin 168 protruding from the wall 166' of the disc-shaped element 166.

Figure 24:
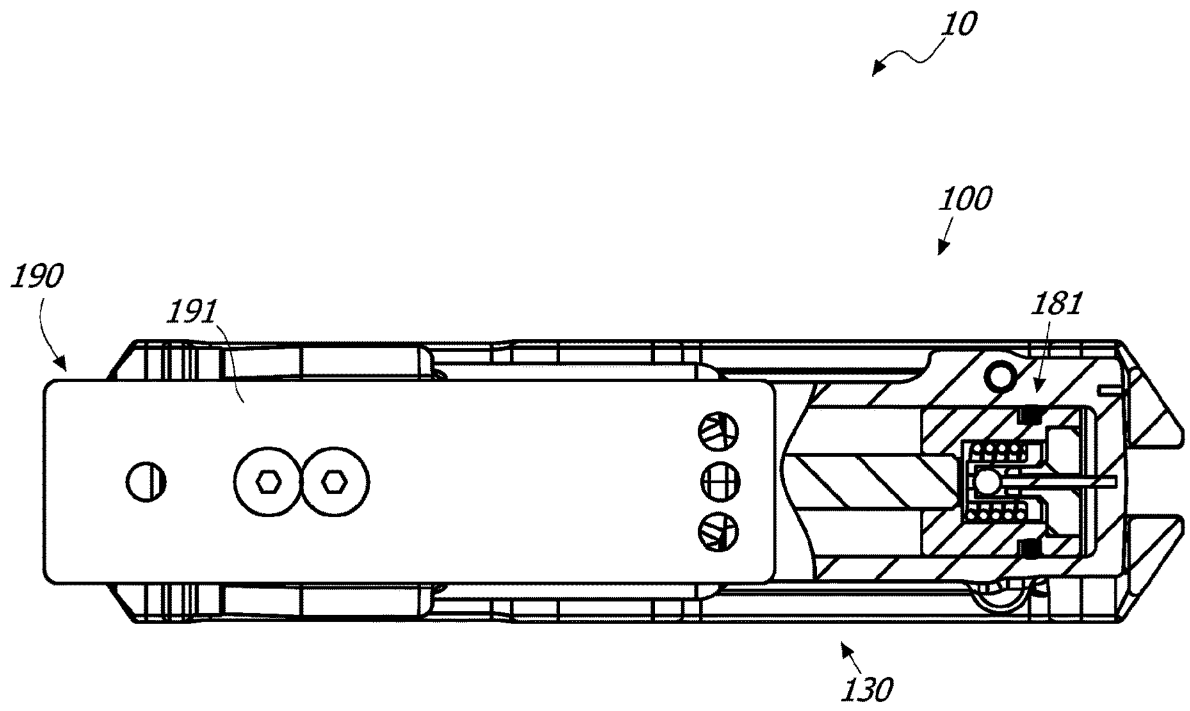
FIGS. 24, 26 and 28 are a cross-sectional view a hinge 100 with a different embodiment of the valve means 181 in different operative positions, with FIGS. 25, 27 and 29 showing an enlargement of some details respectively of FIGS. 24, 26 and 28.

It is clear that in the embodiment of FIG. 24, the portion 168' may be the portion protruding from the bottom wall 138.

Possibly, a hinge 100 with a different snap angle may be obtained by changing the length of the pins 168.

For example, in the shown figures, the snap angle measures approximately 10°. Therefore, the door A may be controlled to close between 80° and 10°. It is clear that such angle may vary depending on the needs.

Should the plunger element 160 continue the stroke thereof toward the bottom wall 138, the pins 168 will promote the opening of the valve means 181, for example the moving away of the shutter 184 from the opening 175 or of the annular element 185 away from the disc-shaped element 166, therefore allowing the flow of the working fluid through the circuit 172 from the compartment 177 to the compartment 176, therefore obtaining the so-called final snap up to the end-of-stroke position of the plunger 160 (FIG. 11, FIG. 20, FIG. 22 and FIG. 25).

In particular, in the latter configuration, in the embodiment from FIG. 4 to FIG. 7, the end 169 may abut against the bottom wall 138 while the opposite end 169' may abut against the ball 184, in the embodiment of figures FIG. 10 to FIG. 16, the end 169 may abut against the bottom wall 138 while the opposite end 169' may abut against the surface 186" of the annular relief 186, while in the embodiment from FIG. 17 to FIG. 21, the end 169 may abut against the bottom wall 138 while the opposite end 169' may be in the blind hole of the annular element 185, while in the embodiment from FIG. 24 to FIG. 29, the end 169 may be fixed with the bottom wall 138 while the opposite end 169' may abut against the ball 184.

In the light of the above, the head 165 of the plunger 160 may be configured so as to act as a check valve, as an overpressure valve and as a final snap.

In this manner, the hinge 100 may be particularly compact.

It is clear that the plunger element 160 with the valve means 181 described above may be used in any hydraulic hinge. Preferably, the hinge 100 may comprise a plunger 160 with a head 165 sealingly inserted into a chamber 135 to partition the latter into the two compartments 176, 177.

The invention is susceptible to numerous modifications and variants all falling within the inventive concept outlined in the attached claims. All details can be replaced by other technically equivalent elements, and the materials can be different depending on the needs, without departing from the scope of protection of the invention.

Even though the invention has been described with particular reference to the attached figures, the reference numbers utilised in the description and in the claims are meant for improving the intelligibility of the invention and thus do not limit the claimed scope of protection in any manner whatsoever.

The invention claimed is:

1. A system for a controlled rotary movement of a closing element around a rotation axis with respect to a stationary support structure, the system comprising:

a first hinge device; and a second hinge device, wherein each of the first hinge device and the second hinge device comprises:

a fixed element, which can be anchored to one of the stationary support structure and the closing element;

a movable element, which can be anchored to the other one of the stationary support structure and the closing element, wherein one of the movable or the fixed element includes respectively a first or a second hinge body, the other one of the movable or the fixed element comprising respectively a first and a second pivot defining a respective first or second axis, the first and the second hinge body and first and second pivot being rotatably coupled to enable a rotation around the first and the second axis between a first operative position corresponding to an open or a closed position of the closing element and a second operative position corresponding to the closed or the open position of the closing element, wherein the first and the second hinge device are configured to be be-coupled with the same closing element in longitudinally staggered positions so that the first and the second axis coincide with each other and with the rotation axis, wherein the first and the second hinge device cooperate to control the rotation of the closing element around the rotation axis between the closed position and the open position of the closing element, wherein each of the first and the second hinge body comprises a working chamber defining a respective third axis perpendicular to the first and the second axis and a respective slider slidable in the working chamber, the first and the second pivot including first and second cams, the first and second slider comprising first and second cam follower means operatively connected with the first and the second cams so that, to a relative rotation of the first and the second pivot and the first and the second hinge body, there corresponds a sliding of the first and the second slider, wherein the first hinge device comprises control means acting on the respective first slider to brake a mutual rotation respectively of the first hinge body and the first pivot, the second hinge device comprising motion promotion means acting in coordination with the control means on the respective second slider to promote a mutual rotation respectively of the second hinge body and the first or the second pivot, wherein the first cam of the first hinge device comprises a first operative surface having an initial angular portion, a first convex operative portion, and a concave portion, wherein the second cam of the second hinge device comprises a second operative surface having an initial concave portion, a second operative portion that is convex and different from the first operative portion, and an additional concave portion, the first and the second operative portions being configured so that upon the rotation of the first hinge body and of the first pivot from the one of the first or the second operative positions over an angular section, the first slider and the second slider slide over a different length section, and wherein the first and the second operative portions are mutually configured so that along the section of the rotation of the closing element from the open position to the closed position, the first hinge device acts on the closing element with a first torque and the second hinge device acts on the closing element with a second torque counteracting the first torque, the second torque being lower than the first torque so as to allow the rotation along the section of the rotation of the closing element from the open position to the closed position, the first and the second operative portions being configured so that the first and second torques are variable upon the rotation of the first and the second hinge body and of the first and the second pivot along the section of the rotation from the one of the first or the second operative position to the other one of the first or the second operative position so as to allow the rotation with a predetermined speed of the closing element along the section from the open position to the closed position.

2. The system according to claim 1, wherein the first and the second hinge device cooperate to control the rotation of the closing element so that the closing element has a predetermined rotation speed upon a movement of the first and the second hinge body and of the first and the second pivot from one of the first or the second operative position to the other one of the first or the second operative position.

3. The system according to claim 2, wherein the predetermined rotation speed is constant upon the movement of the first and the second hinge body and of the first and the second pivot the section of the rotation from one of the first or the second operative position to the other one of the first or the second operative position.

4. The system according to claim 2, wherein the first cam and the first cam follower means and the second cam and the second cam follower means are mutually configured so that an action of the motion promotion means counteracted by an action of the control means imparts to the closing element the predetermined rotation speed along the section of the rotation thereof between the open position and the closed position.

5. The system according to claim 1, wherein the first or the second slider of the one of the first or the second hinge device comprises a plunger inserted into a portion of the respective working chamber to partition the respective working chamber into a first and a second variable volume compartment, the control means being hydraulic.

6. The system according to claim 5, wherein plunger is sealingly inserted into the portion of the respective working chamber, the control means comprising a hydraulic circuit placing in fluid communication the first and the second variable volume compartment and valve means for controlling flow in the hydraulic circuit.

7. The system according to claim 1, wherein the working chamber of the other one of the first or the second hinge device comprises a bottom wall, the slider being slidable between a proximal position from, and a distal position to, the bottom wall, the motion promotion means including elastic counteracting means interposed between the respective first or the second slider and the bottom wall to promote a sliding of the bottom wall between the proximal position and the distal position.

8. The system according to claim 1, wherein the first and the second operative portions are shaped so that the closing element rotates with a first predetermined speed for a section of the rotation from the open position to the closed position and with a second predetermined speed for a second section of the rotation thereof between the open position of the closing element and the closed position of the closing element.

9. A system for a controlled rotary movement of a closing element around a rotation axis with respect to a stationary support structure, the system comprising:

a first hinge device; and a second hinge device, wherein each of the first hinge device and the second hinge device comprises:

a fixed element, which can be anchored to one of the stationary support structure and the closing element;

a movable element, which can be anchored to the other one of the stationary support structure and the closing element, wherein one of the movable or the fixed element includes respectively a first or a second hinge body, the other one of the movable or the fixed element comprising respectively a first and a second pivot defining a respective first or second axis, the first and the second hinge body and first and second pivot being rotatably coupled to enable a rotation around the first and the second axis between a first operative position corresponding to an open or a closed position of the closing element and a second operative position corresponding to the closed or the open position of the closing element, wherein the first and the second hinge device are configured to be coupled with the same closing element in longitudinally staggered positions so that the first and the second axis coincide with each other and with the rotation axis, wherein the first and the second hinge device cooperate to control the rotation of the closing element around the rotation axis between the closed position and the open position of the closing element, wherein each of the first and the second hinge body comprises a working chamber defining a respective third axis perpendicular to the first and the second axis and a respective slider slidable in the working chamber, the first and the second pivot including first and second cams, the first and second slider comprising first and second cam follower means operatively connected with the first and the second cams so that, to a relative rotation of the first and the second pivot and the first and the second hinge body, there corresponds a sliding of the first and the second slider, wherein the first hinge device comprises control means acting on the respective first slider to brake a mutual rotation respectively of the first hinge body and the first pivot, the second hinge device comprising motion promotion means acting on the respective second slider promote a mutual rotation respectively of the second hinge body and the first or the second pivot, wherein the first cam of the first hinge device comprises a first operative surface having a first convex operative portion, the second cam of the second hinge device comprising a second operative surface having a second operative portion that is convex and different from the first operative portion, the first and the second operative portions being configured so that upon the rotation of the first hinge body and of the first pivot from the one of the first or the second operative positions over an angular section, the first slider and the second slider slide over a different length section, wherein the first and the second operative portions are mutually configured so that along the section of the rotation of the closing element from the open position to the closed position, the first hinge device acts on the closing element with a first torque and the second hinge device acts on the closing element with a second torque counteracting the first torque, the second torque being lower than the first torque so as to allow the rotation along the section of the rotation of the closing element from the open position to the closed position, the first and the second operative portions being configured so that the first and second torques are variable upon the rotation of the first and the second hinge body and of the first and the second pivot along the section of the rotation from the one of the first or the second operative position to the other one of the first or the second operative position so as to allow the rotation with a predetermined speed of the closing element along the section from the open position to the closed position, and wherein at least one of the first or the second hinge device comprises respective fixing means for fixing to the respective stationary support structure or the closing element, the at least one of the first or the second hinge device and the respective fixing means being engageable to each other to have a mutual predetermined distance, the first or the second hinge device and the respective fixing means being configured so that once engaged, they are mutually slidable along a respective axis to vary a predetermined operative distance.

10. The system according to claim 9, wherein the at least one of the first or the second hinge device is arranged upward with respect to the other one of the first or the second hinge device.

11. The system according to claim 9, wherein the first or the second pivot of the at least one of the first or the second hinge device is integrally coupled with the respective fixing means, the respective hinge body comprising a respective seat for the respective pivot configured so that the respective hinge body slides along the respective first axis with respect to the respective pivot to define a maximum variation of the predetermined operative distance.

12. The system according to claim 11, wherein the respective working chamber includes a partitioning element interposed between the respective seat for the respective pivot and the portion into which there is inserted a plunger, so as to prevent a hydraulic working fluid from flowing out from the plunger.

13. The system according to claim 9, wherein the first or the second slider of the one of the first or the second hinge device comprises a plunger inserted into portion of the respective working chamber to partition the respective working chamber into a first and a second variable volume compartment, the control means being hydraulic.

14. The system according to claim 13, wherein the respective pivot comprises a coupling portion for integrally coupling with respective fixing means, the respective hinge body having an upper wall configured to face the respective fixing means, the upper wall comprising a through opening for the coupling portion of the respective pivot, the respective pivot being slidable relatively to the through opening) upon a sliding of the respective hinge body with respect to the respective pivot.

15. The system according to claim 13, wherein the respective hinge body has a pair of first and second opposite abutment surfaces, the respective pivot comprising respective first and second end-stroke surfaces configured to interact with the first and the second abutment surfaces of the respective hinge body, the respective pivot being movable between a retracted position, in which the first abutment and end-stroke surfaces are in contact with each other and the second abutment and end-stroke surfaces are spaced apart from each other, and an extended position in which the first abutment and end-stroke surfaces are mutually spaced apart and the second abutment and end-stroke surfaces are in contact with each other.

* * * * *